US011451431B2

(12) United States Patent
Takeuchi

(10) Patent No.: US 11,451,431 B2
(45) Date of Patent: Sep. 20, 2022

(54) METHOD FOR CONTROLLING SERVER DEVICE, RECORDING MEDIUM, SERVER DEVICE, TERMINAL DEVICE, AND SYSTEM

(71) Applicant: GREE, Inc., Minato-ku (JP)

(72) Inventor: Masaru Takeuchi, Minato-ku (JP)

(73) Assignee: GREE, Inc., Minato-ku (JP)

( * ) Notice: Subject to any disclaimer, the term of this patent is extended or adjusted under 35 U.S.C. 154(b) by 149 days.

(21) Appl. No.: 16/843,939

(22) Filed: Apr. 9, 2020

(65) Prior Publication Data

US 2020/0235984 A1 Jul. 23, 2020

Related U.S. Application Data

(63) Continuation of application No. 14/182,790, filed on Feb. 18, 2014, now Pat. No. 10,659,288.

(30) Foreign Application Priority Data

Feb. 21, 2013 (JP) .................................. 2013-032135
Feb. 28, 2013 (JP) .................................. 2013-039290

(51) Int. Cl.
*A63F 13/795* (2014.01)
*H04L 41/06* (2022.01)
(Continued)

(52) U.S. Cl.
CPC ............ *H04L 41/06* (2013.01); *A63F 13/795* (2014.09); *A63F 13/822* (2014.09);
(Continued)

(58) Field of Classification Search
CPC .......................... A63F 13/795; G07F 17/3272
See application file for complete search history.

(56) References Cited

U.S. PATENT DOCUMENTS 7,311,608 B1 12/2007 Danieli et al.
8,388,450 B1 * 3/2013 McGuirk .................. A63F 9/24
463/42
(Continued)

FOREIGN PATENT DOCUMENTS

JP 2004-237071 A 8/2004
JP 2005-34303 2/2005
(Continued)

OTHER PUBLICATIONS

Japanese Office Action dated Jun. 4, 2020 in Patent Application No. 2019-039068 (with English translation), 6 pages.
(Continued)

*Primary Examiner* — James S. McClellan
(74) *Attorney, Agent, or Firm* — Oblon, McClelland, Maier & Neustadt, L.L.P.

(57) ABSTRACT

Provided is a method for controlling a server device for providing a service which enables users to be associated with each other and includes a storage unit for storing, for each user provided with the service, information on different users associated with the user, information on each event provided in the service and information on each user participating in the event. The server device transmits an event list including the information on each event to each user device, lets the user participate in an event selected from the event list when receiving a request to participate in the event from each user device, makes the event proceed when receiving a request to proceed with the event from each user device, and associates and stores, when the event is over, the information on the users participated in the event in the storage unit, thus associating the users with each other.

21 Claims, 18 Drawing Sheets

(51) Int. Cl.
  *A63F 13/822* (2014.01)
  *H04L 67/131* (2022.01)
  *G07F 17/32* (2006.01)
(52) U.S. Cl.
  CPC ...... *G07F 17/3225* (2013.01); *G07F 17/3272* (2013.01); *H04L 67/38* (2013.01)

(56) References Cited

U.S. PATENT DOCUMENTS

| | | | |
|---|---|---|---|
| 2005/0021159 | A1 | 1/2005 | Ogawa |
| 2007/0060354 | A1 | 3/2007 | Theimer et al. |
| 2008/0207331 | A1 | 8/2008 | Beale |
| 2009/0177977 | A1 | 7/2009 | Jones et al. |
| 2010/0056247 | A1 | 3/2010 | Nicely et al. |
| 2011/0065511 | A1 | 3/2011 | Mahan et al. |
| 2011/0124415 | A1 | 5/2011 | Shimano |
| 2011/0237317 | A1 | 9/2011 | Noonan et al. |
| 2011/0250971 | A1 | 10/2011 | van Os et al. |
| 2012/0064969 | A1 | 3/2012 | Uchibori |
| 2012/0110099 | A1 | 5/2012 | Fujihara et al. |
| 2012/0142429 | A1 | 6/2012 | Muller |
| 2012/0322560 | A1* | 12/2012 | Joo ................. A63F 13/795 463/42 |
| 2013/0035114 | A1 | 2/2013 | Holden et al. |
| 2013/0053152 | A1 | 2/2013 | Tabata |
| 2013/0116044 | A1 | 5/2013 | Schwartz |
| 2013/0165237 | A1* | 6/2013 | Park ................. A63F 13/795 463/42 |
| 2013/0184040 | A1* | 7/2013 | Nonaka ............ A63F 13/35 463/7 |
| 2013/0244740 | A1 | 9/2013 | Shimamura et al. |
| 2013/0296045 | A1 | 11/2013 | Dun et al. |
| 2014/0195929 | A1 | 7/2014 | Crocker et al. |

FOREIGN PATENT DOCUMENTS

| | | |
|---|---|---|
| JP | 2006-149663 A | 6/2006 |
| JP | 2009-140501 A | 6/2009 |
| JP | 2009-163745 | 7/2009 |
| JP | 2009-247474 A | 10/2009 |
| JP | 2010-42083 A | 2/2010 |
| JP | 2011-98013 | 5/2011 |
| JP | 2011-110139 A | 6/2011 |
| JP | 2012-055435 A | 3/2012 |
| JP | 2012-61059 | 3/2012 |
| JP | 2012-61060 | 3/2012 |
| JP | 5086489 | 9/2012 |
| JP | 2013-588 A | 1/2013 |
| JP | 2013-000588 A | 1/2013 |
| JP | 2013-34827 | 2/2013 |
| JP | 5843993 B2 | 1/2016 |
| WO | WO 2013/016687 A1 | 1/2013 |
| WO | WO 2013/049392 A1 | 4/2013 |

OTHER PUBLICATIONS

Japanese Office Action dated Sep. 14, 2021 in Japanese Patent Application No. 2019-213981 (with unedited computer generated English translation), 2 pages.
Japanese Office Action dated Sep. 14, 2021 in Japanese Patent Application No. 2019-213981 (with unedited computer generated English translation), 4 pages.
Gundam Online, Weekly Famitsu, Enterbrain Co., Ltd., Oct. 7, 2010. vol. 25, No. 42, p. 87, 4 total pages.
Kento Nakajima. Technology that supports online games—Behind the scenes of a magnificent play space, 1st edition, Technical Review Co., Ltd., Apr. 25, 2011, pp. 105-107, 6 totai pages.
Japanese Office Action dated Sep. 8, 2020 in Japanese Patent Application No. 2019-039068 (with English translation), 4 pages.
Japanese Office Action dated Aug. 25, 2020 in Japanese Patent Application No. 2019-190308 (with English translation), 6 pages.
Japanese Office Action dated Aug. 25, 2020 in Japanese Patent Application No. 2018-240287 (with English Iranslation), 5 pages.
2.2/28 ***********, Retrieved from the internet:, [Search on Nov. 8, 2013], URL: http://blog.livedoor.jp/nyita/archives/51811228.html, and <>[Jan. 1, 2006] Feb. 28, 2012, 5 pages.
"A great update of *******, a "Rare Card W-Getcampaign" is also pending!", Retrieved from the internet, [search on Nov. 8, 2013], URL: http://app.famitsu.com/20120229_37824 /, Feb. 29, 2012, 7 pages.
Office Action issued in corresponding Japanese Application No. 2017-137393 dated Jul. 10, 2018, 6 pages (with English translation).
Notice of Reasons for Refusal dated Apr. 16, 2019 in corresponding Japanese Patent Application No. 2017-216582 (with English translation) (4 pages).
JPO Office action for Japanese Patent Application No. 2016-180896 dated Apr. 4, 2017, 2 pages.
Office action dated Feb. 6, 2017 for corresponding Japanese Patent Application No. 2015-193783, including machine translation 8pp.
Office action dated May 10, 2016 issued in corresponding JP Patent Application No. 2015-222903, including Eng. Translation, 8pp.
English translation of Report of Pretrial Reexamination drafted May 25, 2015 in corresponding Japanese Patent Application No. 2014-155300, 5pp.
Partial English translation of Japanese Office action dated Oct. 28, 2014 in Japanese Patent Application No. 2014-155300, 5pp.
Office action dated Nov. 19, 2013 for corresponding JP Application No. 2013-032135, including English translation, 8pp.
Dragon Poker, Dengeki Game Appli, vol. 8, ASCII Media Works Inc., pp. 30-33, pub. Feb. 14, 2013.
Steel Chronicle, Monthly Arcadia, Enterbrain Inc., vol. 12, No. 12, pp. 002-003, pub. Oct. 29, 2011.
Samurai & Dragons, Monthly Famitsu Connect! On, Enterbrain Inc., vol. 2, No. 7, pp. 38-39, pub. May 26, 2012.
Dragon League, Famitsu Gree, vol. 1, Enterbrain Inc., pp. 64-65, pub. Sep. 15, 2011.
Densetsu No Mamoribito by GMO, Weekly Famitsu, Enterbrain Inc., vol. 26, No. 6, pp. 196-197, pub. Jan. 20, 2011.
Dragon Collection, Appli Style vol. 5, Eastpress, pp. 006-010, pub. Nov. 15, 2011.
Office action dated Nov. 19, 2013 for corresponding JP Application No. 2013-039290, including English translation, 8pp.
"Dragon Ark" is greatly updated!, Internet <URL http://app.FAMITSU.com/20120229_37824/>, pub. Feb. 29, 2012, 9pp.
2/28 Dragon Ark update, "Diary of Nyita", Internet <URL http://blog.livedoor.jp/nyita/archives/51811228.html>, pub. Feb. 28, 2012, 6pp.
Nemureru Jyukai no NUSHI 1st day, Internet <URL http://monhantankenki.masa-mune.jp/2013_2/2013_02_06_02.html>, pub. Feb. 6, 2012, 6pp.
Notice of Reasons for Refusal dated Nov. 26, 2020 in Japanese Patent Application No. 2019-213981 (with English language translation), 11 pages.

* cited by examiner

FIG. 4a

| BATTLE ID | NAME | END TIME AND DATE | ENEMY (ID, HEALTH POINT) | PARTICIPATING USER (ID, NUMBER OF ATTACKS) |
|---|---|---|---|---|
| 1 | BATTLE 1 | 13/01/01 12:00:00 | (1, 500) | (1,10),(2,0),(3,5),(4,5) |
| 2 | BATTLE 2 | 13/01/02 12:00:00 | (2, 1000) | - |
| ... | | | | |

FIG. 4b

| ENEMY ID | NAME | IMAGE | ATTACK POWER | DEFENSE POWER | HEALTH POINT |
|---|---|---|---|---|---|
| 1 | ENEMY 1 | a1.jpg | 200 | 200 | 1000 |
| 2 | ENEMY 2 | a2.jpg | 300 | 100 | 1000 |
| ... | | | | | |

FIG. 4c

| USER ID | NAME | IMAGE | HEALTH POINT | CARD ID | DECK CARD (ID, HEALTH POINT) | ASSOCIATION ID |
|---|---|---|---|---|---|---|
| 1 | USER 1 | u1.jpg | 100 | 1, 2, 3, 4 | (1, 30), (2, 50), (3, 100) | 1 |
| 2 | USER 2 | u2.jpg | 200 | 1, 2, 3, 4 | (1, 100), (3, 100), (4, 100) | - |
| ... | | | | | | |

FIG. 4d

| CARD ID | NAME | IMAGE | ATTACK POWER | DEFENSE POWER | HEALTH POINT |
|---|---|---|---|---|---|
| 1 | CARD 1 | c1.jpg | 100 | 100 | 100 |
| 2 | CARD 2 | c2.jpg | 150 | 50 | 100 |
| ... | | | | | |

FIG. 4e

| ASSOCIATION ID | USER ID |
|---|---|
| 1 | 1,3,4 |
| 2 | 5,6,7 |
| ... | ... |

FIG. 9a

| BATTLE ID | NAME | END TIME AND DATE | ENEMY(ID, HEALTH POINT) | USER(ID, NUMBER OF ATTACKS) | ITEM ID |
|---|---|---|---|---|---|
| 1 | BATTLE 1 | 13/01/01 12:00:00 | (1,500) | (1,10),(3,5),(4,5),(6,10) | 1 |
| 2 | BATTLE 2 | 13/01/02 12:00:00 | (2,1000) | | 2 |
| ... | | | | | ... |

FIG. 9b

| ENEMY ID | NAME | IMAGE | ATTACK POWER | DEFENSE POWER | HEALTH POINT |
|---|---|---|---|---|---|
| 1 | ENEMY 1 | a1.jpg | 200 | 200 | 1000 |
| 2 | ENEMY 2 | a2.jpg | 300 | 100 | 1000 |
| ... | | | | | ... |

FIG. 9c

| USER ID | NAME | IMAGE | HEALTH POINT | CARD ID | DECK CARD(ID, HEALTH POINT) | ITEM ID | TEAM ID |
|---|---|---|---|---|---|---|---|
| 1 | USER a | u1.jpg | 100 | 1,2,3,4 | (1,30),(2,50),(3,100) | - | 1 |
| 2 | USER b | u2.jpg | 200 | 1,2,3,4 | (1,100),(3,100),(4,100) | - | 1 |
| ... | | | | | | | ... |

FIG. 9d

| CARD ID | NAME | IMAGE | ATTACK POWER | DEFENSE POWER | HEALTH POINT |
|---|---|---|---|---|---|
| 1 | CARD 1 | c1.jpg | 100 | 100 | 100 |
| 2 | CARD 2 | c2.jpg | 150 | 50 | 100 |
| ... | | | | | ... |

FIG. 9e

| ITEM ID | NAME | IMAGE |
|---|---|---|
| 1 | ITEM 1 | i1.jpg |
| 2 | ITEM 2 | i2.jpg |
| ... | | |

FIG. 9f

| TEAM ID | USER ID |
|---|---|
| 1 | 1,2,3 |
| 2 | 4,5 |
| ... | ... |

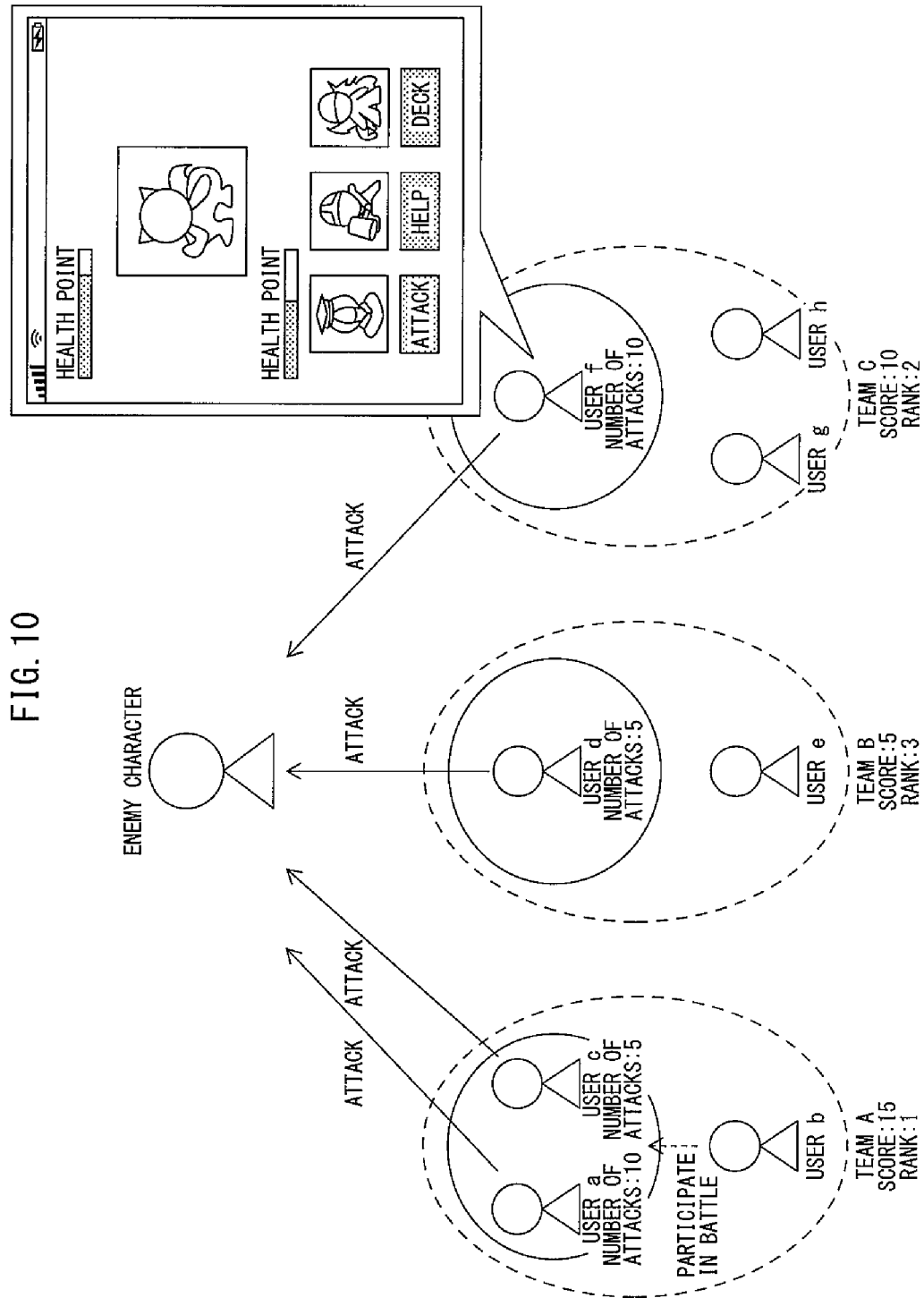

METHOD FOR CONTROLLING SERVER DEVICE, RECORDING MEDIUM, SERVER DEVICE, TERMINAL DEVICE, AND SYSTEM

CROSS REFERENCE TO RELATED APPLICATIONS

This application is a continuation application of U.S. application Ser. No. 14/182,790, filed Feb. 18, 2014, which claims benefit of JP 2013-032135, filed on Feb. 21, 2013 and JP 2013-039290, filed on Feb. 28, 2013. The benefit of priority is claimed to each of the foregoing, and the entire contents of each of the foregoing are incorporated herein by reference.

TECHNICAL FIELD

The present invention relates to a method for controlling a server device, a recording medium, a server device, a terminal device, and a system.

BACKGROUND

In recent years, a server which provides a game to portable devices via a communication network has been commonly used. The game provided by the server includes one in which multiple users can participate (i.e., a "social game"), in which the users cannot only battle and cooperate with each other but also communicate with each other (for example, refer to Japanese Unexamined Patent Publication No. 2005-034303).

As an example of such a social game, a game is known in which a user battles against an enemy character by using, for example, cards (i.e., a "card battle game") (for example, refer to Japanese Unexamined Patent Publication No. 2012-061059). In a card battle game, by using cards, a user battles against an enemy character created by the game program, while cooperating with a different user. Each user can possess an arbitrary number of cards. Further, by using at least one possessed card, each user forms a set of cards (i.e., a "deck") to be used for the battle. Each card has parameters such as attack power, defense power, and health point, and the users reduce the health point parameter value of the enemy character based on the parameter values of the cards which form the deck. The enemy character also has parameters similarly to the cards, and, based on these parameter values, reduces the health point parameter values of the cards. The users and the enemy character alternately attack each other, and the battle ends when the health point parameter value of the cards which form the deck has fallen to 0, or when the health point parameter value of the enemy character has fallen to 0.

SUMMARY

However, conventional social games simply allow multiple users to attack an enemy character, and do not take into account communications between the users after an enemy character is defeated. There is not a mechanism for developing communications between the users after an enemy character is defeated. Accordingly, the users may no longer wish to continue the game.

The present invention has been devised to overcome the above prior art problem, and an object of the invention is to provide a method for controlling a server device, a recording medium, a server device, a terminal device, and a system that can maintain and enhance the users' wish to continue the game.

A method for controlling a server device for providing a service which enables users to be associated with each other is provided. The server device includes a storage unit for storing, for each of the users provided with the service, an information piece on a different one of the users who is associated with the user, and storing an information piece on each event provided in the service and an information piece on each of the users participating in the event. The method includes transmitting an event list including the information piece on each event, to a terminal device of each of the users, letting, when receiving a request to participate in one of the events which is selected from the event list from the terminal device of any one of the users, the user participate in the event, making the event proceed, when receiving a request to proceed with the event from the terminal device of any one of the users participating in the event, and associating, when the event is over, the users who have participated in the event with each other, by associating with each other the information pieces on the respective users who have participated in the event and storing the associated information pieces in the storage unit.

Preferably, in the above method, the users participating in the event are not associated with each other before the event ends.

Preferably, in the above method, when the event is over, the server device transmits a user list including the information pieces on the respective users who have participated in the event, to the terminal device of each of the users who have participated in the event, and when receiving, from the terminal device of any one of the users who have participated in the event, a request to associate the user with one of the users who is selected from the user list, the server device associates with each other the information piece on the user relating to the terminal device and the information piece on the user selected from the user list, and then stores the associated information pieces in the storage unit, thus associating the user relating to the terminal device and the user selected from the user list with each other.

Preferably, in the above method, the respective users in the user list are ranked according to degree of contribution to progress of the event.

Preferably, in the above method, one or more users achieving degree of contribution to progress of the event which is larger than a threshold value are selected in advance, among the users in the user list.

Preferably, in the above method, when the event is over, the server device associates with each other information pieces on users each achieving degree of contribution to progress of the event which is larger than a threshold value, among the users who have participated in the event, and then stores the associated information pieces in the storage unit, thus associating the users who have participated in the event with each other.

A non-transitory computer-readable recording medium having recorded thereon a program for controlling a server device for providing a service which enables users to be associated with each other is provided. The server device includes a storage unit for storing, for each of the users provided with the service, an information piece on a different one of the users who is associated with the user, and storing an information piece on each event provided in the service and an information piece on each of the users participating in the event. The program causes the server device to execute a process. The process includes transmitting an event list including the information piece on each event, to a terminal device of each of the users, letting, when receiving a request to participate in one of the events which is selected from the event list from the terminal device of any one of the users, the user participate in the event, making the event proceed, when receiving a request to proceed with the event from the terminal device of any one of the users participating in the event, and associating, when the event is over, the users who have participated in the event with each other, by associating with each other the information pieces on the respective users who have participated in the event and storing the associated information pieces in the storage unit.

A server device for providing a service which enables users to be associated with each other is provided. The server device includes a storage unit for storing, for each of the users provided with the service, an information piece on a different one of the users who is associated with the user, and storing an information piece on each event provided in the service and an information piece on each of the users participating in the event, a communication unit for communicating with a terminal device of each of the users, a transmitting unit for transmitting an event list including the information piece on each event, to a terminal device of each of the users, a user-participation unit for letting, when receiving a request to participate in one of the events which is selected from the event list from the terminal device of any one of the users, the user participate in the event, an event-proceeding unit for making the event proceed, when receiving a request to proceed with the event from the terminal device of any one of the users participating in the event, and a user association unit for associating, when the event is over, the users who have participated in the event with each other, by associating with each other the information pieces on the respective users who have participated in the event and storing the associated information pieces in the storage unit.

A server device for providing a service which enables users to be associated with each other is provided. The server device includes a storage means for storing, for each of the users provided with the service, an information piece on a different one of the users who is associated with the user, and storing an information piece on each event provided in the service and an information piece on each of the users participating in the event, a means for communicating with a terminal device of each of the users, a means for transmitting an event list including the information piece on each event, to a terminal device of each of the users, a means for letting, when receiving a request to participate in one of the events which is selected from the event list from the terminal device of any one of the users, the user participate in the event, a means for making the event proceed, when receiving a request to proceed with the event from the terminal device of any one of the users participating in the event, and a means for associating, when the event is over, the users who have participated in the event with each other, by associating with each other the information pieces on the respective users who have participated in the event and storing the associated information pieces in the storage means.

A terminal device of a user capable of communicating with a server device for providing a service which enables users to be associated with each other is provided. The server device includes a storage unit for storing, for each of the users provided with the service, an information piece on a different one of the users who is associated with the user relating to the terminal device among the users, and storing an information piece on each event provided in the service and an information piece on each of the users participating in the event. The terminal device includes a communication unit for receiving an event list including the information piece on each event from the server device, transmitting, to the server device, a participation request for letting the user relating to the terminal device participate in one of the events which is selected from the event list, transmitting, when the user is participating in the event, a proceeding request for making the event proceed, to the server device, receiving, when the event is over, a user list including the information piece on each of the users who have participated in the event, from the server device, and transmitting, to the server device, an association request to associate the user relating to the terminal device with one of the users who is selected from the user list, and a processing unit for controlling the communication unit.

A system including a server device for providing a service which enables users to be associated with each other, and a terminal device of each of the users provided with the service is provided. The server device includes a storage unit for storing, for each of the users provided with the service, an information piece on a different one of the users who is associated with the user, and storing an information piece on each event provided in the service and an information piece on each of the users participating in the event, a communication unit for communicating with a terminal device of each of the users, a transmitting unit for transmitting an event list including the information piece on each event, to a terminal device of each of the users, a user-participation unit for letting, when receiving a request to participate in one of the events which is selected from the event list from the terminal device of any one of the users, the user participate in the event, an event-proceeding unit for making the event proceed, when receiving a request to proceed with the event from the terminal device of any one of the users participating in the event, and a user association unit for associating, when the event is over, the users who have participated in the event with each other, by associating with each other the information pieces on the respective users who have participated in the event and storing the associated information pieces in the storage unit. The terminal device includes a communication unit for communicating with the server device, a receiving unit for receiving the event list, and a transmitting unit for transmitting, to the server device, the request to participate in one of the events and the request to proceed with the event.

A method for controlling a server device for making a game proceed in which a plurality of users participate and a parameter value of a game character is reduced is provided. The server device includes a storage unit for storing teams to which the plurality of users belong, the plurality of users participating in the game, and the parameter value. The method includes a user participation step in which, when receiving a request to participate in the game from a terminal device of any one of the plurality of users, the server device lets the user relating to the terminal device participate in the game, a game proceeding step in which, when receiving a request to make the game proceed from a terminal device of any one of the plurality of users participating in the game, the server device makes the game proceed, and a rewarding step in which, when the parameter value has fallen to 0, the server device retrieves the teams to which the plurality of users participating in the game belong, calculates a score relating to the progress of the game for each of the retrieved teams, and gives a reward to each of all the users belonging to the team obtaining a highest one of the calculated scores, among the plurality of users participating in the game.

Preferably, the above method further includes a game initiation step in which, when receiving a request to initiate the game from a terminal device of any one of the plurality of users, the server device retrieves the team to which the user relating to the terminal device belongs, and a different user belonging to the retrieved team, among the plurality of users participating in the game, and then transmits an information piece on the retrieved different user, to the terminal device.

Preferably, in the game initiation step of the above method, the server device further transmits an information piece on the reward, to the terminal device.

Preferably, in the game initiation step of the above method, the server device further transmits an information piece on a team different from the retrieved team to which the user relating to the terminal device belongs, among the teams, to the terminal device.

Preferably, in the above method, when receiving a request to transmit a demand to participate in the game from a terminal device of any one of the plurality of users participating in the game, the server device retrieves the team to which the user relating to the terminal device belongs, retrieves different users belonging to the retrieved team, retrieves a different user not participating in the game among the retrieved different users, and transmits a demand to participate in the game to a terminal device of the retrieved different user not participating in the game, in the game proceeding step.

Preferably, in the above method, the storage unit further stores a parameter value relating to each of the plurality of users, and, in the game proceeding step, when receiving a request to make the game proceed from a terminal device of any one of the plurality of users participating in the game, the server device makes the game proceed, and when the parameter value of the user relating to the terminal device has fallen below a threshold value, the server device retrieves the team to which the user relating to the terminal device belongs, retrieves different users belonging to the retrieved team, retrieves a different user not participating in the game among the retrieved different users, and transmits a demand to participate in the game to a terminal device of the retrieved different user not participating in the game.

Preferably, in the above method, when receiving a request to participate in the game from the terminal device of the retrieved different user not participating in the game, within a predetermined time period after transmitting the demand to participate in the game to the terminal device, the server device lets the user relating to the terminal device participate in the game, and gives the user relating to the terminal device a different reward from the reward, in the user participation step.

Preferably, in the game proceeding step of the above method, the server device further transmits an information piece on the reward, to the terminal device of the retrieved different user not participating in the game.

Preferably, in the game proceeding step of the above method, the server device further transmits, to the terminal device of the retrieved different user not participating in the game, an information piece on a team different from the team to which the retrieved user relating to the terminal device belongs, among the information pieces on the teams.

Preferably, in the rewarding step of the above method, the server device calculates, for each of the teams to which the retrieved users participating in the game belong, a score relating to progress of the game, on the basis of degree of contribution to the progress of the game made by the users belonging to the team, among the users participating in the game.

A non-transitory computer-readable recording medium having recorded thereon a program for controlling a server device for making a game proceed in which a plurality of users participate and a parameter value of a game character is reduced is provided. The server device includes a storage unit for storing teams to which the plurality of users belong, the plurality of users participating in the game, and the parameter value. The program causes the server device to execute a process. The process includes letting, when receiving a request to participate in the game from a terminal device of any one of the plurality of users, the user relating to the terminal device participate in the game, making the game proceed, when receiving a request to make the game proceed from a terminal device of any one of the plurality of users participating in the game, and retrieving, when the parameter value has fallen to 0, the teams to which the plurality of users participating in the game belong, calculating a score relating to the progress of the game for each of the retrieved teams, and giving a reward to each of all the users belonging to the team obtaining a highest one of the calculated scores, among the plurality of users participating in the game.

A server device for making a game proceed in which a plurality of users participate and a parameter value of a game character is reduced is provided. The server device includes a storage unit for storing teams to which the plurality of users belong, the plurality of users participating in the game, and the parameter value, a communication unit for communicating with a terminal device of each of the users, a user participation unit for letting, when receiving a request to participate in the game from a terminal device of any one of the plurality of users, the user relating to the terminal device participate in the game, a game proceeding unit for making the game proceed, when receiving a request to make the game proceed from a terminal device of any one of the plurality of users participating in the game, and a rewarding unit for retrieving, when the parameter value has fallen to 0, the teams to which the plurality of users participating in the game belong, calculating a score relating to the progress of the game for each of the retrieved teams, and giving a reward to each of all the users belonging to the team obtaining a highest one of the calculated scores, among the plurality of users participating in the game.

A server device for making a game proceed in which a plurality of users participate and a parameter value of a game character is reduced is provided. The server device includes a storage means for storing teams to which the plurality of users belong, the plurality of users participating in the game, and the parameter value, a means for communicating with a terminal device of each of the users, a means for letting, when receiving a request to participate in the game from a terminal device of any one of the plurality of users, the user relating to the terminal device participate in the game, a means for making the game proceed, when receiving a request to make the game proceed from a terminal device of any one of the plurality of users participating in the game, and a means for retrieving, when the parameter value has fallen to 0, the teams to which the plurality of users participating in the game belong, calculating a score relating to the progress of the game for each of the retrieved teams, and giving a reward to each of all the users belonging to the team obtaining a highest one of the calculated scores, among the plurality of users participating in the game.

A terminal device of a user capable of communicating with a server device for making a game proceed in which a plurality of users participate and a parameter value of a game character is reduced is provided. The server device includes a storage unit for storing teams to which each of the users belongs, the users participating in the game, and the parameter value. The terminal device includes a communication unit for transmitting a participation request to let the user participate in the game, to the server device, transmitting, when the user is participating in the game, a proceeding request to make the game proceed, to the server device, and receiving a reward from the server device if the user is participating in the game and belongs to the team obtaining a highest score relating to progress of the game among scores calculated for the respective teams, when the parameter value has fallen to 0, and a processing unit for controlling the communication unit.

A system including a server device for making a game proceed in which a plurality of users participate and a parameter value of a game character is reduced, and a terminal device of each of the users is provided. The server device includes a storage unit for storing teams to which the plurality of users belong, the plurality of users participating in the game, and the parameter value, a communication unit for communicating with the terminal device, a user participation unit for letting, when receiving a request to participate in the game from a terminal device of any one of the plurality of users, the user relating to the terminal device participate in the game, a game proceeding unit for making the game proceed, when receiving a request to make the game proceed from a terminal device of any one of the plurality of users participating in the game, and a rewarding unit for retrieving, when the parameter value has fallen to 0, the teams to which the plurality of users participating in the game belong, calculating a score relating to the progress of the game for each of the retrieved teams, and giving a reward to each of all the users belonging to the team obtaining a highest one of the calculated scores, among the plurality of users participating in the game. The terminal device includes a communication unit for communicating with the server device, and a transmitting unit for transmitting, to the server device, the request to participate in the game and the request to make the game proceed.

According to the above method for controlling a server device, recording medium, server device, terminal device, and system, the users who have participated in the same event of the service are associated with each other, making it possible to develop communications between the users who have achieved the same goal and to maintain and/or increase the users' wish to continue the service. This enables the users to maintain their interest in the service.

BRIEF DESCRIPTION OF THE DRAWINGS

Other features and advantages of the present optical device will be apparent from the ensuing description, taken in conjunction with the accompanying drawings, in which:

FIGS. 4a to 4e illustrate examples of data structures of the various types of tables;

FIGS. 9a to 9f illustrate examples of data structures of the various types of tables;

FIG. 10 illustrates an overview of progress of the game;

DESCRIPTION

Figure 1:
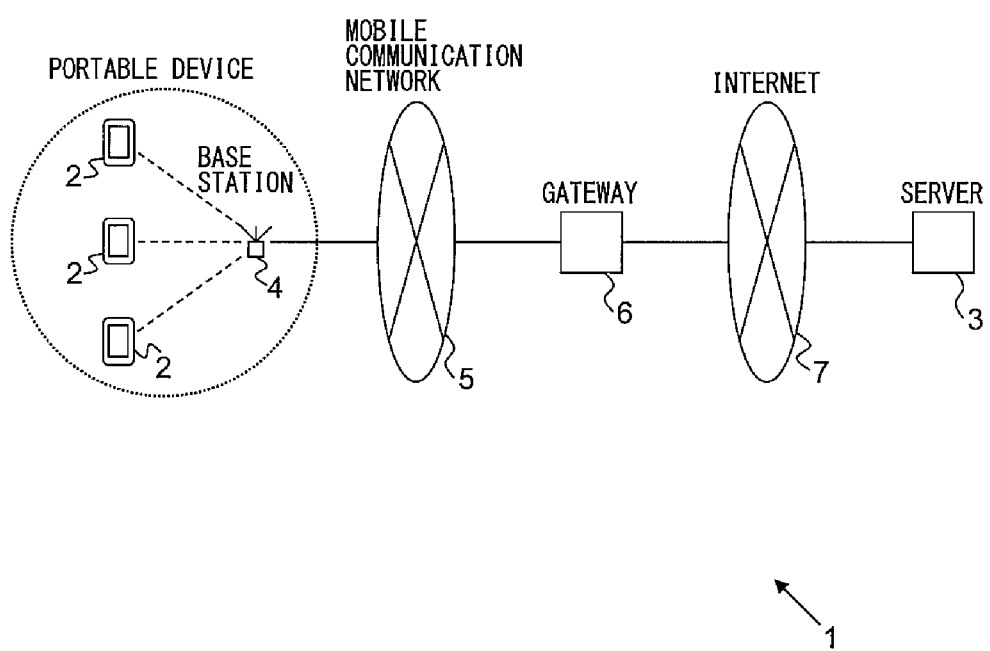
FIG. 1 illustrates an example of a schematic configuration of a game system.

Hereinafter, with reference to the drawings, a method for controlling a server device, a recording medium, a server device, a terminal device, and a system will be described. It should be noted that the technical scope of the present invention is not limited to embodiments of the invention, but covers the invention described in the claims and its equivalent.

First Embodiment

In this embodiment, a server provides a service which enables users to communicate with each other. In particular, the server provides a community service called a social networking service (SNS). Specifically, the server transmits information on a user (such as the name, a diary, a bulletin board, and a progress state of a game) not only to the login user but also each user who is in a friend status with the login user, thereby enabling the users to communicate with each other. The server may provide a service only to the users who have completed member registration.

Each user can establish a friend status with one or more different users. The server associates, when receiving a friend request from a user to a different user, the users with each other. For example, the server receives a friend request from a portable device of a user a to a user b. Then, the server transmits the friend request from the user a to a portable device of the user b. The server determines, when receiving, from the portable device of the user b, a permit response to the friend request from the user a, that a friend status has been established between the user a and the user b, and registers identification information of the user b in association with identification information of the user a while registering the identification information of the user a in association with the identification information of the user b.

In addition, each user can also post a message on a bulletin board. The server transmits, when receiving a message to be posted on a bulletin board from the portable device of the user a, a web page including the received message to be posted, to the portable device of the user a. At the same time, the server makes the posted message of the user an available to the users each having a friend status with the user a. For example, the user b having a friend status with the user a can see the posted message of the user a, and can make a comment, an evaluation (e.g., "Like"), and the like on the posted message of the user a, thus enabling the users to communicate with each other.

Moreover, in this embodiment, the server provides an online game service in which multiple users can participate.

In particular, the server provides a card battle game service in which multiple users (preferably, multiple users who are not associated with each other) work together to battle against an enemy character. A portable device transmits, to the server, a request for participation in a battle against an enemy character (event), in response to an instruction from a user. The server lets the user participate in the battle according to the request from the portable device of the user. In addition, the server makes the battle proceed according to a request from a portable device. When the battle is over, the server associates the users who have participated in the battle, with each other.

FIG. 1 illustrates an example of a schematic configuration of a game system 1.

The game system 1 includes at least one portable device 2 and a server 3. The portable device 2 and the server 3 are connected to each other via a communication network, and are connected to each other, for example, via a base station 4, a mobile communication network 5, a gateway 6, and the Internet 7. A program to be executed by the portable device 2 (e.g., a browsing program) and a program to be executed by the server 3 (e.g., a game program) communicate with each other by using a communication protocol such as a Hypertext Transfer Protocol (HTTP).

Figure 2:
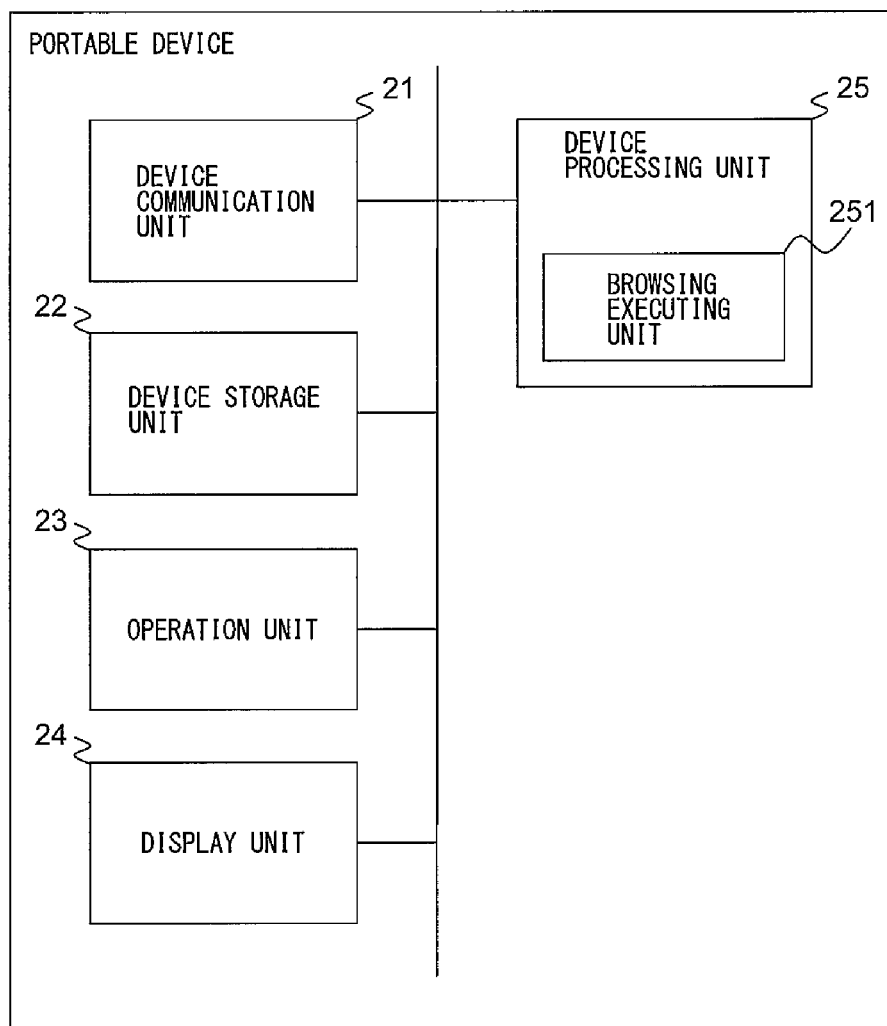
FIG. 2 illustrates an example of a schematic configuration of the portable device.

FIG. 2 illustrates an example of a schematic configuration of the portable device 2.

The portable device 2 is connected to the server 3 via the base station 4, the mobile communication network 5, the gateway 6, and the Internet 7, to communicate with the server 3. The portable device 2 requests the progress of a card battle game of the server 3 in response to an operation of an operation unit 23 (e.g., a button) by a user. The portable device 2 receives display data relating to the progress of the card battle game from the server 3, and displays the received display data. In order to implement the foregoing functions, the portable device 2 includes a device communication unit 21, a device storage unit 22, the operation unit 23, a display unit 24, and a device processing unit 25.

While a multifunctional mobile phone (a so-called "smartphone") may be assumed as being the portable device 2, the present invention is not limited to this. The portable device 2 may be, for example, a mobile phone (a so-called "feature phone"), a personal digital assistant (PDA), a portable game machine, a portable music player, a tablet personal computer (PC) and the like, as long as the present invention is applicable thereto.

The device communication unit 21 includes a communication interface circuit including an antenna having a sensitivity band in a predetermined frequency band, and connects the portable device 2 to a wireless communication network. The device communication unit 21 establishes a wireless signal link with the base station 4 by a Code Division Multiple Access (CDMA) system or the like via a channel to be assigned by the base station 4, and communicates with the base station 4. The device communication unit 21 transmits data supplied from the device processing unit 25 to the server 3 or the like. The device communication unit 21 supplies the data received from the server 3 or the like to the device processing unit 25.

The device storage unit 22 includes at least one device selected, for example, from a semiconductor memory, a magnetic disk device, and an optical disk device. The device storage unit 22 stores an operating system program, a driver program, an application program, data, and the like used for processing in the device processing unit 25. For example, the device storage unit 22 stores an input device driver program for controlling the operation unit 23 and an output device driver program for controlling the display unit 24, as the driver program. The device storage unit 22 stores a program and the like for retrieving and displaying display data relating to the progress of the card battle game, as the application program. The device storage unit 22 stores display data, video data, image data and the like relating to the progress of the card battle game, as the data. Further, the device storage unit 22 may store temporary data relating to predetermined processing.

The operation unit 23 may be any device capable of operating the portable device 2, for example, a touch pad, a keyboard or the like. The user can input letters, numbers, and the like using the operation unit 23. When operated by the user, the operation unit 23 generates a signal corresponding to the operation. The generated signal is supplied to the device processing unit 25 as an instruction from the user.

The display unit 24 may be any device capable of displaying a video, an image and the like, for example, a liquid crystal display and an organic electro-luminescence (EL) display. The display unit 24 displays a video, an image and the like corresponding to video data and image data supplied from the device processing unit 25.

The device processing unit 25 includes one or more processors and their peripheral circuits. The device processing unit 25 is, for example, a central processing unit (CPU), and integrally controls an overall operation of the portable device 2. The device processing unit 25 controls operations of the device communication unit 21, the display unit 24, and the like so that various types of processing of the portable device 2 are performed in an appropriate order in accordance with the programs stored in the device storage unit 22, the operation of the operation unit 23, and the like. The device processing unit 25 performs processing based on the programs (the operating system program, the driver program, the application program and the like) stored in the device storage unit 22. The device processing unit 25 can execute multiple programs (application programs and the like) in parallel.

The device processing unit 25 includes at least a browsing executing unit 251. Each of the units is a functional module implemented by a program to be executed by the processor included in the device processing unit 25. Alternatively, each of the units may be provided as a firmware on the portable device 2.

The browsing executing unit 251 retrieves and displays the display data relating to the progress of the card battle game. Specifically, a request to retrieve the display data relating to the progress of the card battle game is transmitted to the server 3 via the device communication unit 21 in response to an instruction from the user. The browsing executing unit 251 receives corresponding display data from the server 3 via the device communication unit 21. The browsing executing unit 251 generates drawing data based on the received display data. Specifically, the browsing executing unit 251 interprets the received display data to specify control data and content data, lays out the specified content data according to the specified control data, and generates the drawing data. Then, the browsing executing unit 251 outputs the generated drawing data to the display unit 24.

Figure 3:
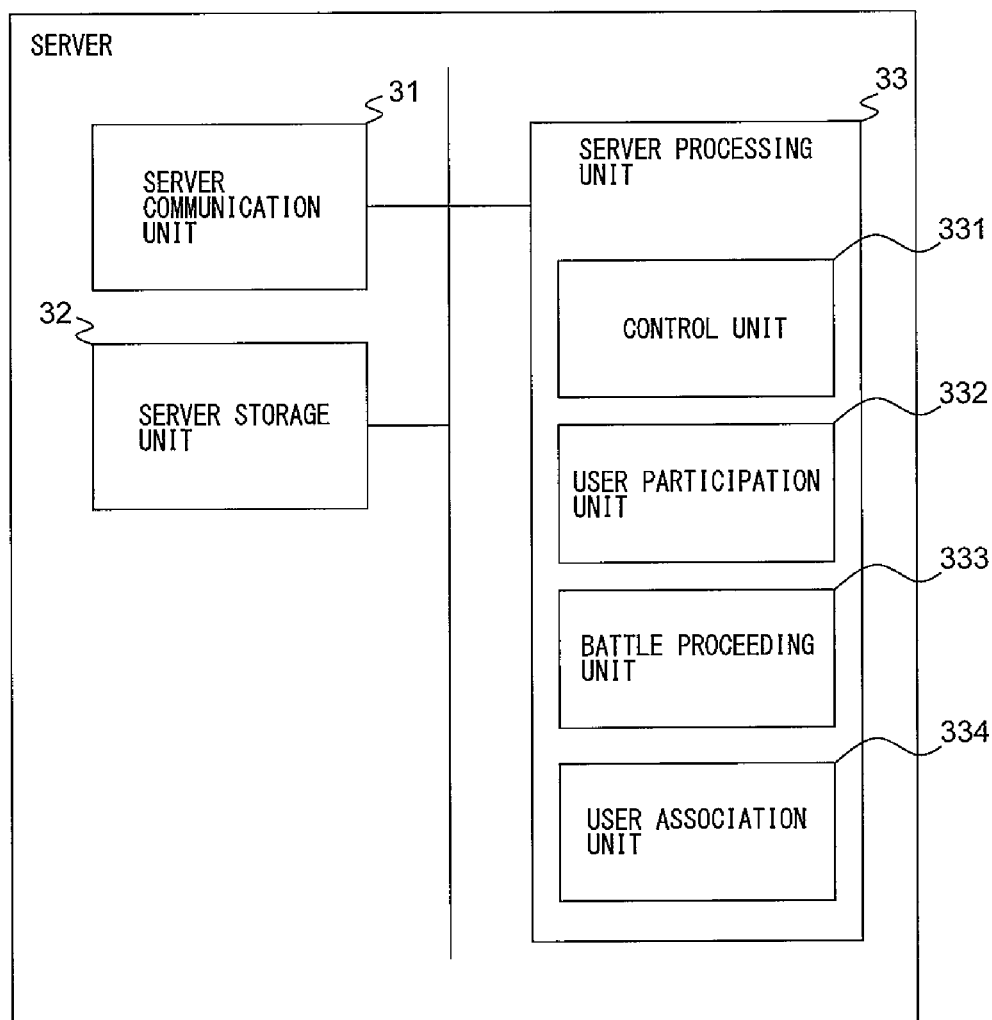
FIG. 3 illustrates an example of a schematic configuration of the server.

FIG. 3 illustrates an example of a schematic configuration of the server 3.

The server 3 proceeds the card battle game in response to a request from the portable device 2. The server 3 generates the display data relating to the progress of the card battle game, and transmits the generated display data to the portable device 2. In order to implement the foregoing functions, the server 3 includes a server communication unit 31, a server storage unit 32, and a server processing unit 33.

The server communication unit 31 includes a communication interface circuit for connecting the server 3 to the Internet 7, and communicates with the Internet 7. The server communication unit 31 supplies the data received from the portable device 2 or the like to the server processing unit 33. The server communication unit 31 transmits the data supplied from the server processing unit 33 to the portable device 2 or the like.

The server storage unit 32 includes at least one of a magnetic tape device, a magnetic disk device and an optical disk device, for example. The server storage unit 32 stores an operating system program, a driver program, an application program, data, and the like used for processing in the server processing unit 33. The server storage unit 32 stores for example, a card battle game program and the like for advancing the card battle game and generating display data relating to its result, as the application program. The server storage unit 32 stores, as the data, a battle table (FIG. 4a) for managing battles, an enemy table (FIG. 4b) for managing enemy characters, a user table (FIG. 4c) for managing users, a card table (FIG. 4d) for managing cards, and an association table (FIG. 4e) for managing association between the users, and the like. Further, the server storage unit 32 may store temporary data relating to certain processing.

FIGS. 4a to 4e illustrate examples of data structures of the various types of tables.

FIG. 4a illustrates an example of the data structure of the battle table. The battle table includes, for each battle, an identification number (ID) of the battle, a name, end time and date, an ID and health point parameter (current value) of the enemy character, IDs and the numbers of attacks of the participating users, and the like.

FIG. 4b illustrates an example of the data structure of the enemy table. The enemy table includes, for each enemy character, an ID of the enemy character, a name, a file name of image data, parameters such as attack power, defense power, and health point (initial value), and the like.

FIG. 4c illustrates an example of the data structure of the user table. The user table includes, for each user, an ID of the user, a name, a file name of image data, a parameter such as health point, IDs of possessed cards, IDs and health point parameters (current values) of possessed cards which form a deck, association IDs to which the user belongs, and the like.

FIG. 4d illustrates an example of the data structure of the card table. The card table includes for each card, an ID of the card, a name, a file name of image data, parameters such as attack power, defense power, and health point (initial value), and the like.

FIG. 4e illustrates an example of the data structure of the association table. The association table includes, for each association, an ID of the association, IDs of the users who belong to the association, and the like.

The server processing unit 33 includes one or more processors and their peripheral circuits. The server processing unit 33 is for example, a CPU, and integrally controls an overall operation of the server 3. The server processing unit 33 controls an operation of the server communication unit 31 or the like so that various types of processing of the server 3 are performed in an appropriate order in accordance with the programs stored in the server storage unit 32. The server processing unit 33 executes processing based on the programs stored in the server storage unit 32 (the operating system program, the driver program, the application program and the like). The server processing unit 33 can execute the multiple programs (the application program and the like) in parallel.

The server processing unit 33 includes a control unit 331, a user participation unit 332, a battle proceeding unit 333, and a user association unit 334. Each of the units is a functional module implemented by a program to be executed by the processor included in the server processing unit 33. Alternatively, each of the units may be provided as a firmware on the server 3.

In the following, processing by the control unit 331 will be illustrated.

The control unit 331 controls the progress of the card battle game, and instructs each of the user participation unit 332, the battle proceeding unit 333, the user association unit 334, and the like to perform processing, as appropriate.

The control unit 331 interprets, when receiving a user authentication request from the portable device 2 via the server communication unit 31, the received user authentication request to retrieve the user ID and the password. The control unit 331 instructs a user authentication unit (not illustrated) to perform corresponding processing, using the retrieved user ID and password as parameters.

When the user authentication unit (not illustrated) has authenticated the user, the control unit 331 creates home screen display data. Specifically, the control unit 331 refers to the battle table stored in the server storage unit 32, and retrieves each battle with the end time and date which have not passed yet. The control unit 331 extracts the ID, the name, and the end time and date of the retrieved battle. Then, the control unit 331 creates home screen display data which includes the extracted battle ID and the retrieved user ID, and the like, and which is for displaying, in a predetermined layout, the extracted name and the end time and date of the battle, a button for receiving an instruction to participate in the battle, and the like.

The control unit 331 transmits the created home screen display data to the portable device 2 via the server communication unit 31.

FIGS. 5a to 5d illustrate examples of the display screen of the portable device 2.

Figure 5A:
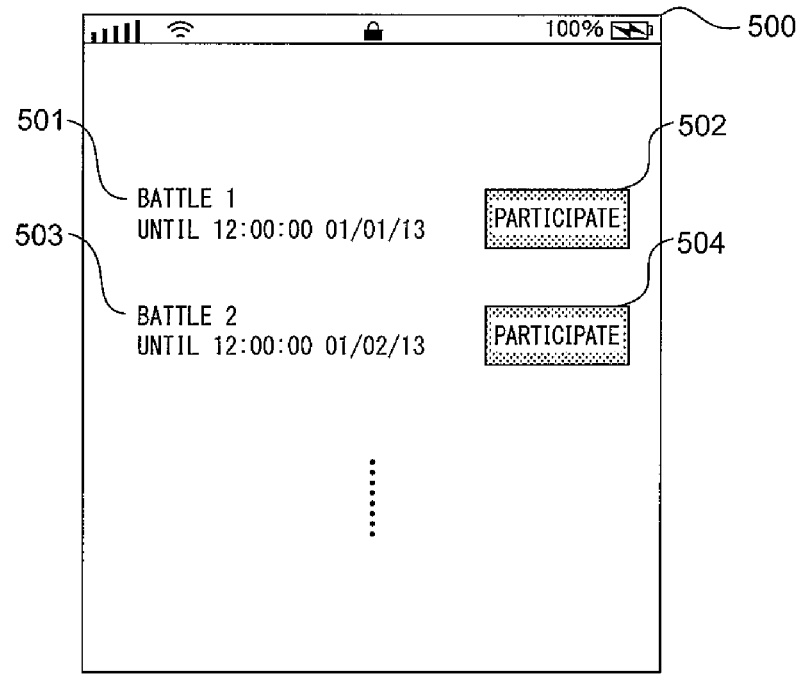
FIGS. 5a to 5d illustrate examples of the display screen of the portable device.

FIG. 5a illustrates a home screen 500 displayed on the basis of the home screen display data. For each battle, a set of a name and end time and date 501 or 503 of the battle is displayed on a left part of the screen, while a "participate" button 502 or 504 is displayed on a right part of the screen. When the "participate" button 502 or 504 is pressed, participation in the corresponding battle is requested to the server 3 via the device communication unit 21.

The control unit 331 instructs, when receiving a battle participation request from the portable device 2 via the server communication unit 31, the user participation unit 332 to perform processing, using the received battle participation request as a parameter.

Moreover, the control unit 331 instructs, when receiving a battle proceeding request from the portable device 2 via the server communication unit 31, the battle proceeding unit 333 to perform processing, using the received battle proceeding request as a parameter.

Furthermore, the control unit 331 instructs, when receiving a user association request from the portable device 2 via the server communication unit 31, the user association unit 334 to perform processing, using the received user association request as a parameter.

The control unit 331 transmits created battle screen display data and the like to the portable device 2 via the server communication unit 31.

In the following, the processing by the user participation unit 332 will be illustrated.

The user participation unit 332 lets the user to participate in a battle. Specifically, the user participation unit 332 interprets the provided battle participation request, to retrieve the battle ID and the user ID. In addition, the user participation unit 332 refers to the battle table stored in the server storage unit 32, using the retrieved battle ID as a key, and thereby retrieves a corresponding battle. Then, the user participation unit 332 adds the retrieved user ID to the IDs of the users participating in the retrieved battle.

The user participation unit 332 creates battle screen display data. Specifically, the user participation unit 332 extracts the ID and the health point parameter of an enemy character of the retrieved battle. In addition, the user participation unit 332 refers to the enemy table stored in the server storage unit 32, using the extracted enemy ID as a key, and thereby extracts the file name of the image data of the corresponding enemy character. Moreover, the user participation unit 332 refers to the user table stored in the server storage unit 32, using the retrieved user ID as a key, and thereby extracts the health point parameter of the corresponding user and the IDs of possessed cards which form a deck of the corresponding user. Further, the user participation unit 332 refers to the card table stored in the server storage unit 32, using the extracted card ID as a key, and thereby extracts the file name of the image data of a corresponding card. Then, the user participation unit 332 creates battle screen display data which includes the retrieved battle ID and the retrieved user ID, and the like, and which is for displaying, in a predetermined layout, the extracted health point parameter of the enemy character, the extracted health point parameter of the user, the image indicated by the extracted file name, buttons such as a button for receiving an instruction to execute an attack, and the like.

Thereafter, the user participation unit 332 terminates the processing.

Figure 5B:
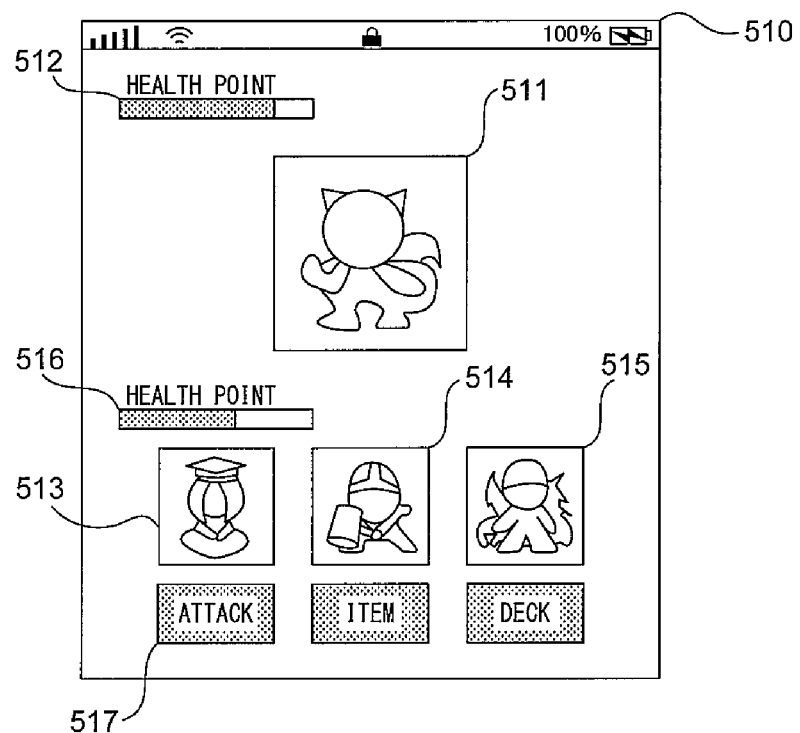

FIG. 5*b* illustrates a battle screen 510 displayed on the basis of the battle screen display data. An image 511 and a health point parameter gauge 512 of the enemy character are displayed on an upper part of the screen, while images 513 to 515 of the cards which form a deck as well as a health point parameter gauge 516 of the user are displayed on a lower part of the screen. In addition, multiple buttons are also displayed on the lower part of the screen. When an "attack" button 517 is pressed, execution of an attack is requested to the server 3 via the device communication unit 21.

In the following, the processing by the battle proceeding unit 333 will be illustrated.

The battle proceeding unit 333 determines whether or not the end time and date of the battle have passed. Specifically, the battle proceeding unit 333 interprets the provided battle proceeding request to retrieve the battle ID, the content of the instruction, and the user ID. In addition, the battle proceeding unit 333 refers to the battle table stored in the server storage unit 32, using the retrieved battle ID as a key, and retrieves a corresponding battle. Then, the battle proceeding unit 333 determines whether or not the end time and date of the retrieved battle have passed.

When the end time and date of the retrieved battle have not passed yet, the battle proceeding unit 333 makes the battle proceed according to the retrieved content of the instruction. Specifically, when the retrieved content of the instruction indicates "execution of an attack", the battle proceeding unit 333 executes attack processing.

For example, the battle proceeding unit 333 refers to the battle table stored in the server storage unit 32, using the retrieved battle ID as a key, and thereby retrieves a corresponding battle. Then, the battle proceeding unit 333 extracts the ID and the health point parameter of the enemy character of the retrieved battle. Moreover, the battle proceeding unit 333 refers to the enemy table stored in the server storage unit 32, using the extracted enemy ID as a key, and thereby extracts parameters indicating the attack power, the defense power, and the like of the corresponding enemy character.

Similarly, the battle proceeding unit 333 refers to the user table stored in the server storage unit 32, using the retrieved user ID as a key, and thereby retrieves a corresponding user. Then, the battle proceeding unit 333 extracts the IDs and the health point parameters of the possessed cards which form the deck of the retrieved user. Moreover, the battle proceeding unit 333 refers to the card table stored in the server storage unit 32, using each extracted card ID as a key, and thereby extracts the parameters indicating the attack power, the defense power, and the like of the corresponding card.

Thereafter, the battle proceeding unit 333 carries out a simulation of the battle on the basis of the extracted parameters of the enemy character and the extracted parameters of the cards. For example, on the basis of the attack power parameter values of the cards and the defense power parameter value of the enemy character, the health point parameter value of the enemy character is reduced. Similarly, on the basis of the attack power parameter value of the enemy character and the defense power parameter values of the cards, the health point parameter values of the cards are reduced.

The battle proceeding unit 333 updates the health point parameter of the enemy character of the retrieved battle. In addition, the battle proceeding unit 333 increments (by 1) the number of attacks of the user corresponding to the retrieved user ID, among the users participating in the retrieved battle. Similarly, the battle proceeding unit 333 updates the health point parameters of the possessed cards which form the deck of the retrieved user.

The battle proceeding unit 333 determines whether or not the updated health point parameter value of the enemy character is 0. When the updated health point parameter value of the enemy character is not 0, the battle proceeding unit 333 creates battle screen display data. Specifically, the battle proceeding unit 333 extracts the ID and the health point parameter of the enemy character of the retrieved battle. Moreover, the battle proceeding unit 333 refers to the enemy table stored in the server storage unit 32, using the extracted enemy ID as a key, and thereby extracts the file name of the image data of the corresponding enemy character. Further, the battle proceeding unit 333 extracts the health point parameter of the retrieved user and the IDs of the possessed cards which form the deck of the retrieved user. Furthermore, the battle proceeding unit 333 refers to the card table stored in the server storage unit 32, using each extracted card ID as a key, and thereby extracts the file name of the image data of the corresponding card. Then, the battle proceeding unit 333 creates battle screen display data which includes the retrieved battle ID and user ID, and the like, and which is for displaying, in a predetermined layout, the extracted health point parameter of the enemy character, the extracted health point parameter of the user, the image indicated by each extracted file name, a button for receiving an instruction to execute an attack, and the like.

By contrast, when the updated health point parameter value of the enemy character has fallen to 0, the battle proceeding unit 333 creates screen display data for user selection. Specifically, the battle proceeding unit 333 extracts the ID of each user participating in the retrieved battle, and the number of the attacks of the user. Then, the battle proceeding unit 333 refers to the user table stored in the server storage unit 32, using the extracted participating user ID as a key, and thereby extracts the name and the file name of the image data of the corresponding participating user. Then, the battle proceeding unit 333 creates screen display data for user selection which includes the extracted participating user IDs, the retrieved user ID, and the like, and which is for displaying the names and images of the extracted participating users in descending order of the number of attacks while displaying, in a predetermined layout, a display area for the names and the images, check boxes for receiving an instruction to select one or more of the participating users, a button for receiving an instruction to associate the users with each other, and the like.

In addition, the battle proceeding unit 333 creates screen display data for user selection, also when the end time and date of the retrieved battle have already passed.

When the retrieved content of the instruction indicates a different operation, the battle proceeding unit 333 performs processing according to the retrieved content of the instruction.

Thereafter, the battle proceeding unit 333 terminates the processing.

Figure 5C:
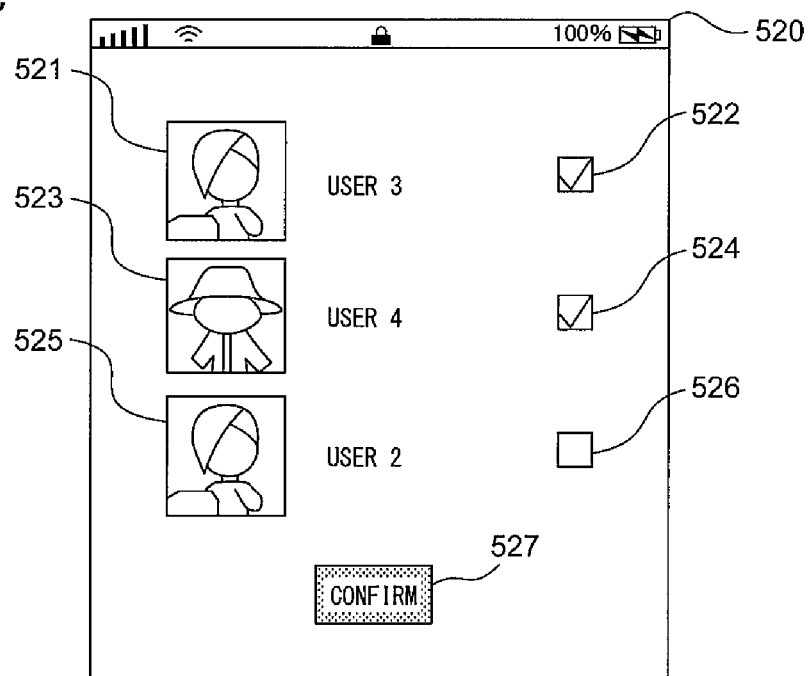

FIG. 5c illustrates a user selection screen 520 displayed on the basis of the screen display data for user selection. Sets 521, 523, and 525 of an image and a name of the respective users who have participated in the battle are displayed on a left part of the screen, in descending order of the degree of contribution to the battle (e.g., the number of attacks), while check boxes 522, 524, and 526 are displayed on a right part of the screen. Participating users are selected according to the check marks placed in the check boxes 522, 524, and 526. Moreover, on a lower part of the screen, a "confirm" button 527 is displayed. When the "confirm" button 527 is pressed, association between the users is requested to the server 3 via the device communication unit 21.

In the following, the processing by the user association unit 334 will be illustrated.

The user association unit 334 determines whether or not one or more participating users have been selected. Specifically, the user association unit 334 interprets the provided user association request to retrieve one or more participating user IDs and the user ID. Thereby, the user association unit 334 determines whether or not one or more participating user IDs have been retrieved.

When one or more participating users have been selected, the user association unit 334 associates the user and each of the one or more participating users with each other. Specifically, when one or more participating user IDs are retrieved, the user association unit 334 assigns an association ID, and then adds the association ID to the association table stored in the server storage unit 32 in association with the one or more participating user IDs, the user ID, and the like. In addition, the user association unit 334 refers to the user table stored in the server storage unit 32, using each of the retrieved participating user IDs as a key, and adds the assigned association ID to the association IDs to which each of the corresponding participating users belongs. Similarly, the user association unit 334 refers to the user table stored in the server storage unit 32, using the retrieved user ID as a key, and adds the assigned association ID to the association IDs to which the corresponding user belongs.

The user association unit 334 creates screen display data for battle end. Specifically, the user association unit 334 creates screen display data for battle end which includes the retrieved user ID and the like, and which is for displaying, in a predetermined layout, text indicating that the battle is over, text indicating that the user is associated with the one or more users who have participated in the battle, a button for receiving an instruction to change to the home screen, and the like.

By contrast, when no participating user has been selected, the user association unit 334 creates screen display data for battle end. Specifically, the user association unit 334 creates screen display data for battle end which includes the retrieved user ID and the like, and which is for displaying, in a predetermined layout, text indicating that the battle is over, a button for receiving an instruction to change to the home screen, and the like.

Thereafter, the user association unit 334 terminates the processing.

Figure 5D:
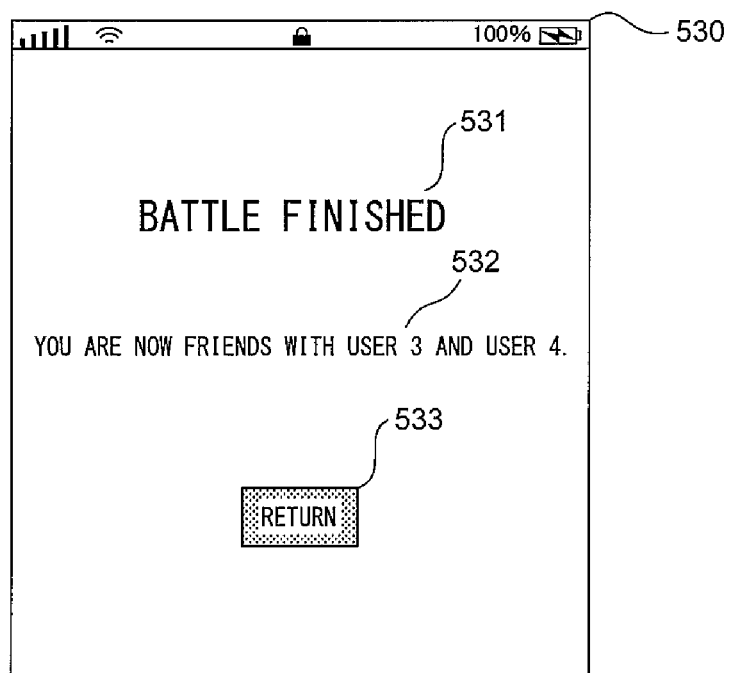

FIG. 5d illustrates a battle end screen 530 displayed on the basis of the screen display data for battle end. Text 531 indicating that the battle is over and text 532 indicating that the user is associated with users 3 and 4 who have participated in the battle are displayed on an upper part of the screen, while a "return" button 533 is displayed on a lower part of the screen. When the "return" button 533 is pressed, changing to the home screen is requested to the server 3 via the device communication unit 21.

Figure 6:
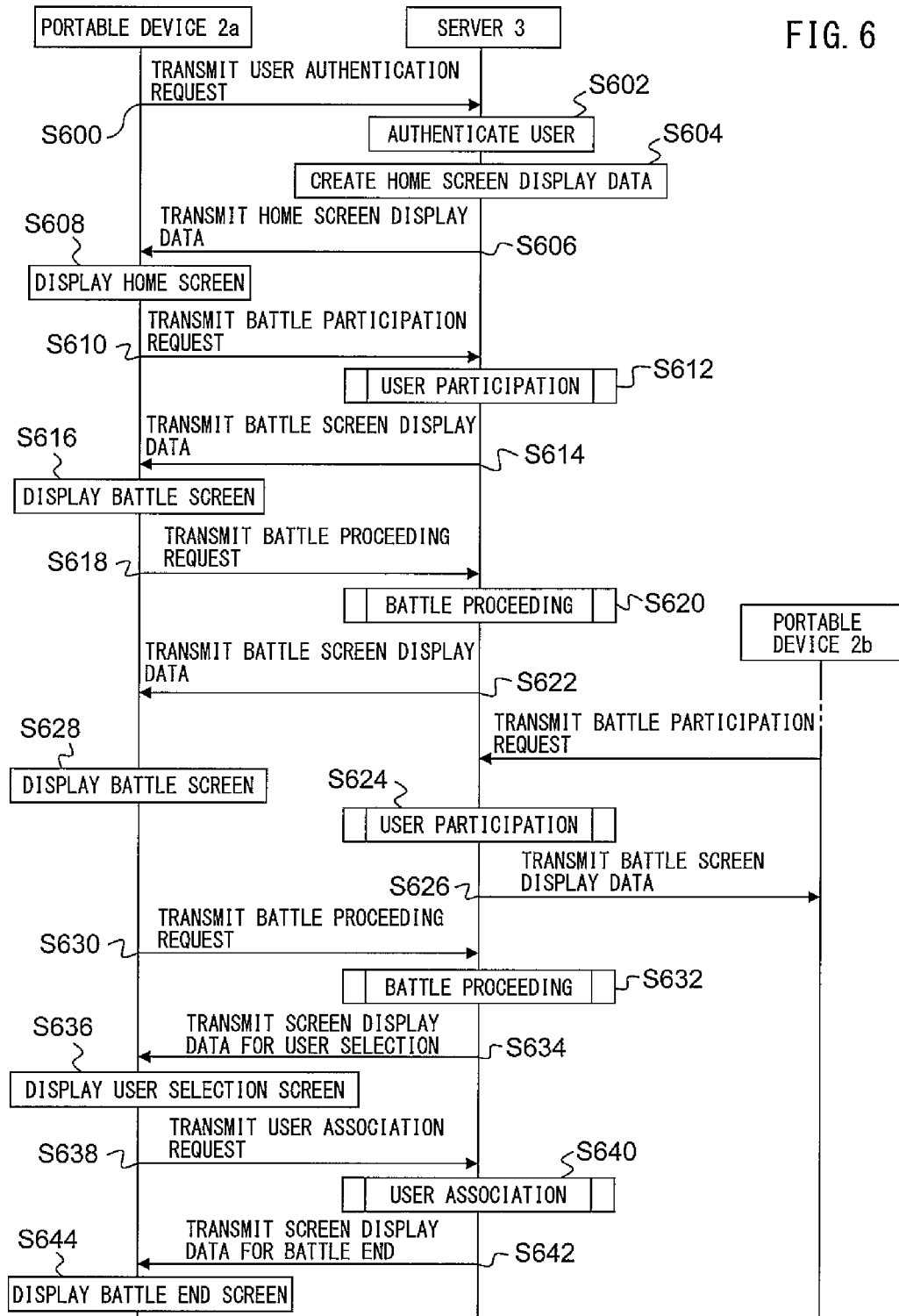
FIG. 6 illustrates an example of an operation sequence of the game system.

FIG. 6 illustrates an example of an operation sequence of the game system 1. In the operation sequence to be illustrated below, users are referred to as the users a and b, the portable device 2 of the user a is referred to as the portable device 2a while the portable device 2 of the user b is referred to as the portable device 2b. This operation sequence is performed mainly by the device processing units 25a and 25b as well as the server processing unit 33 on the basis of programs previously stored in the device storage units 22a and 22b as well as the server storage unit 32, in cooperation with each of the units in the portable devices 2a and 2b as well as the server 3.

The user a instructs the device processing unit 25a to execute a program for retrieving and displaying display data relating to the progress of the card battle game via the operation unit 23a. The device processing unit 25a initiates performing processing on the basis of this program. Specifically, when the user a has input a user ID and a password via the operation unit 23a, the browsing executing unit 251a to be implemented by the program transmits a user authentication request including the input user ID, password, and the like, to the server 3 via the device communication unit 21a (step S600).

The control unit 331 interprets, when receiving the user authentication request from the portable device 2a via the server communication unit 31, the received user authentication request, to retrieve the user ID and the password. The control unit 331 instructs the user authentication unit (not illustrated) to perform authentication processing of the user a, using the retrieved user ID and password as parameters (step S602).

When the user authentication unit (not illustrated) has authenticated the user a, the control unit 331 creates home screen display data relating to the user a (step S604).

The control unit 331 transmits the created home screen display data to the portable device 2a via the server communication unit 31 (step S606).

The browsing executing unit 251a creates, when receiving the home screen display data from the server 3 via the device communication unit 21*a*, drawing data on the basis of the received home screen display data. Moreover, the browsing executing unit 251*a* outputs the created drawing data to the display unit 24*a* to display a home screen thereon (step S608).

The browsing executing unit 251*a* transmits, when being instructed on the home screen to participate in the battle by the user a via the operation unit 23*a*, a battle participation request including the battle ID corresponding to the battle, the user IDs, and the like included in the received home screen display data, to the server 3 via the device communication unit 21*a* (step S610).

The control unit 331 instructs, when receiving the battle participation request from the portable device 2*a* via the server communication unit 31, the user participation unit 332 to perform corresponding processing, using the received battle participation request as a parameter (step S612).

Figure 7A:
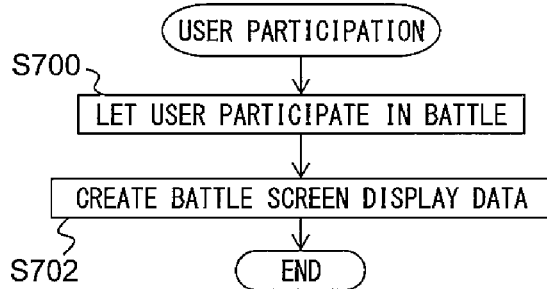
FIGS. 7a to 7c illustrate examples of the operation flows of the server.

FIG. 7*a* illustrates an example of the operation flow of the user participation unit 332.

The user participation unit 332 lets the user participate in the battle (step S700).

The user participation unit 332 creates battle screen display data (step S702).

Then, the user participation unit 332 terminates the processing.

Return to FIG. 6. The control unit 331 transmits the created battle screen display data to the portable device 2*a* via the server communication unit 31 (step S614).

The browsing executing unit 251*a* creates, when receiving the battle screen display data from the server 3 via the device communication unit 21*a*, drawing data on the basis of the received battle screen display data. Moreover, the browsing executing unit 251*a* outputs the created drawing data to the display unit 24*a* to display a battle screen thereon (step S616).

The browsing executing unit 251*a* transmits, when being instructed on the battle screen to execute an attack and the like by the user a, via the operation unit 23*a*, a battle proceeding request including the battle ID, the user ID, the content of the instruction, and the like included in the received battle screen display data, to the server 3 via the device communication unit 21*a* (step S618).

The control unit 331 instructs, when receiving the battle proceeding request from the portable device 2*a* via the server communication unit 31, the battle proceeding unit 333 to perform corresponding processing, using the received battle proceeding request as a parameter (step S620).

Figure 7B:
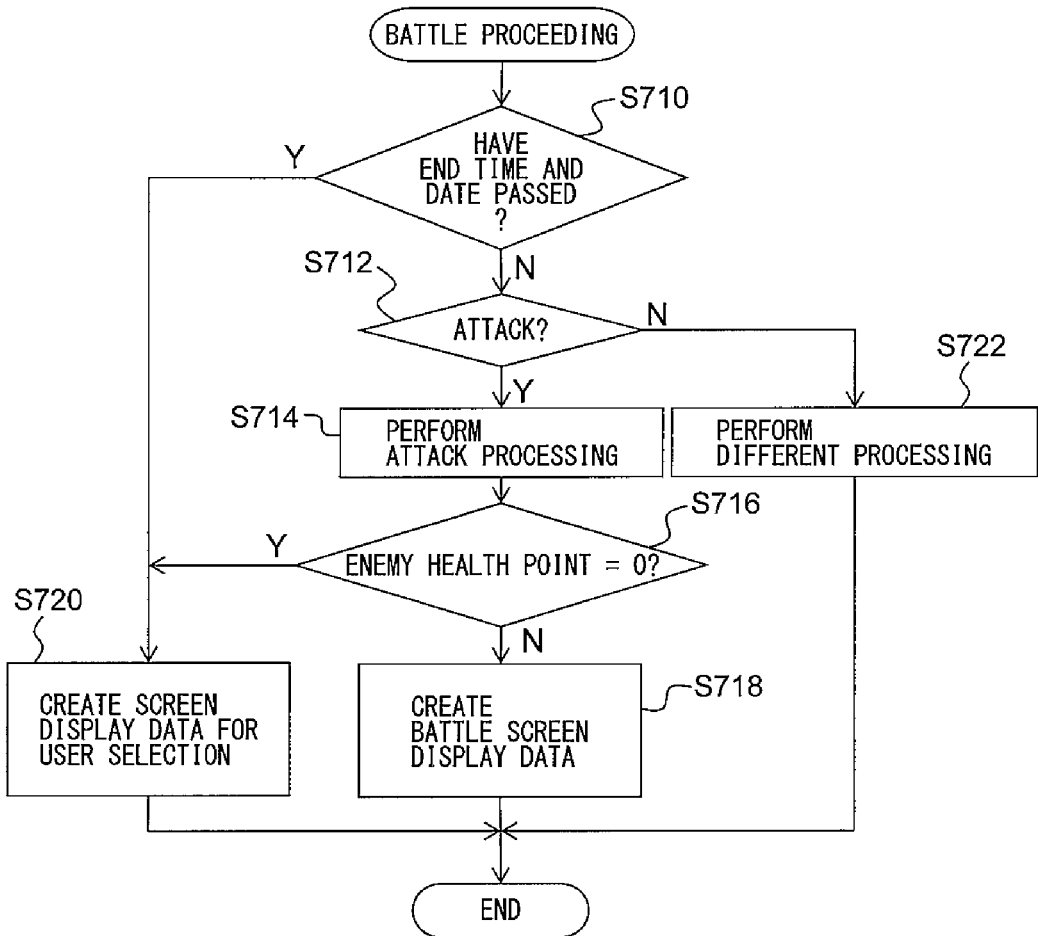

FIG. 7*b* illustrates an example of an operation flow of the battle proceeding unit 333.

The battle proceeding unit 333 determines whether or not the end time and date of the battle have passed (step S710).

When the end time and date of the retrieved battle have not passed yet (NO in step S710), the battle proceeding unit 333 makes the battle proceed according to the retrieved content of the instruction.

Specifically, when the retrieved content of the instruction indicates "execution of an attack" (YES in step S712), the battle proceeding unit 333 executes attack processing (step S714).

Then, the battle proceeding unit 333 determines whether or not the updated health point parameter value of the enemy character is 0 (step S716).

When the updated health point parameter value of the enemy character is not 0 (NO in step S716), the battle proceeding unit 333 creates battle screen display data (step S718).

By contrast, when the updated health point parameter value of the enemy character has fallen to 0 (YES in step S716), the battle proceeding unit 333 creates screen display data for user selection (step S720).

In addition, also when the end time and date of the retrieved battle have already passed (YES in step S710), the battle proceeding unit 333 creates screen display data for user selection (step S720).

When the retrieved content of the instruction indicates a different operation (NO in step S712), the battle proceeding unit 333 performs the processing according to the retrieved content of the instruction (step S722).

Thereafter, the battle proceeding unit 333 terminates the processing.

Return to FIG. 6. When the battle is not over yet, the control unit 331 transmits the created battle screen display data to the portable device 2*a* via the server communication unit 31 (step S622).

The control unit 331 instructs, when receiving a battle participation request from the portable device 2*b* via the server communication unit 31, the user participation unit 332 to perform corresponding processing, using the received battle participation request as a parameter (step S624).

The control unit 331 transmits the created battle screen display data to the portable device 2*a* via the server communication unit 31 (step S626).

The browsing executing unit 251*a* creates, when receiving the battle screen display data from the server 3 via the device communication unit 21*a*, drawing data on the basis of the received battle screen display data. Then, the browsing executing unit 251*a* outputs the created drawing data to the display unit 24*a* to display a battle screen thereon (step S628).

When execution of an attack or the like has been instructed on the battle screen by the user a via the operation unit 23*a*, the browsing executing unit 251*a* transmits a battle proceeding request including the battle ID, the user ID, the content of the instruction, and the like included in the received battle screen display data, to the server 3 via the device communication unit 21*a* (step S630).

The control unit 331 instructs, when receiving the battle proceeding request from the portable device 2*a* via the server communication unit 31, the battle proceeding unit 333 to perform corresponding processing, using the received battle proceeding request as a parameter (step S632).

When the battle is over, the control unit 331 transmits the created screen display data for user selection to the portable device 2*a* via the server communication unit 31 (step S634).

The browsing executing unit 251*a* creates, when receiving the screen display data for user selection from the server 3 via the device communication unit 21*a*, drawing data on the basis of the received screen display data for user selection. Then, the browsing executing unit 251*a* outputs the created drawing data to the display unit 24*a* to display a user selection screen thereon (step S636).

When association between the users has been instructed on the user selection screen by the user a via the operation unit 23*a*, the browsing executing unit 251*a* transmits a user association request including the user ID and the participating user IDs corresponding to the selected participating users, and the like included in the received screen display data for user selection, to the server 3 via the device communication unit 21*a* (step S638).

The control unit 331 instructs, when receiving the user association request from the portable device 2*a* via the server communication unit 31, the user association unit 334 to perform corresponding processing, using the received user association request as a parameter (step S640).

Figure 7C:
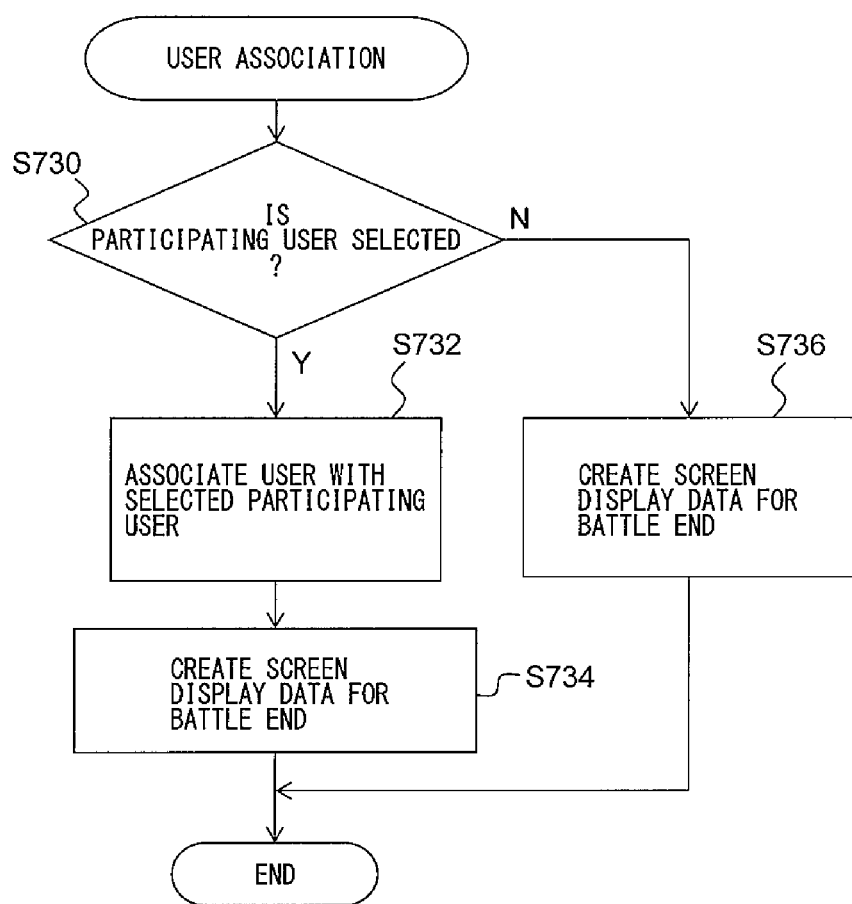

FIG. 7c illustrates an example of an operation flow of the user association unit 334.

The user association unit 334 determines whether or not one or more participating users have been selected (step S730).

When one or more participating users have been selected (YES in step S730), the user association unit 334 associates the user and each of the one or more participating users with each other (step S732).

Then, the user association unit 334 creates screen display data for battle end (step S734).

By contrast, when no participating user has been selected (NO in step S730), the user association unit 334 creates screen display data for battle end (step S736).

Thereafter, the user association unit 334 terminates the processing.

Return to FIG. 6. The control unit 331 transmits the created screen display data for battle end to the portable device 2a via the server communication unit 31 (step S642).

The browsing executing unit 251a creates, when receiving the screen display data for battle end from the server 3 via the device communication unit 21a, drawing data on the basis of the received screen display data for battle end. Moreover, the browsing executing unit 251a outputs the created drawing data to the display unit 24a to display a battle end screen thereon (step S644).

As has been illustrated above, the users who have participated in the same battle of the game are associated with each other, making it possible to develop communications between the users who have achieved the same goal and to maintain and/or increase the users' wish to continue the game. This enables the users to maintain their interest in the service.

It should be noted that the present invention is not limited to this embodiment. For example, in this embodiment, the names and the like of the users who have participated in the battle are displayed on the user selection screen in descending order of the degree of contribution to the battle, and the number of attacks is used as the degree of contribution. However, the degree of contribution may be based on different contribution. For example, the degree of contribution may be based on the number of times the user has participated in the battle, the amount of reduction in the health point parameter value of the enemy character, the number of times the user has used any of the items, or the like. Alternatively, any other criterion may be used instead of using the degree of contribution to the battle. Moreover, any criterion may be set. This enables each user to be easily associated with a desired user, making it likely to further increase users' wish to continue the game.

In this embodiment, users to be associated are manually selected on the user selection screen (by manually placing a check mark in each corresponding checkbox). However, users to be associated may be automatically selected on the basis of a predetermined criterion, and a check mark may be automatically placed in each corresponding check box. Alternatively, only selected users may be displayed. Moreover, association may be made automatically without asking the user via the user selection screen. A criterion used as the predetermined criterion may be that the degree of contribution to the battle is larger than a threshold value, that the attribute of the user is the same as a predetermined attribute, that the number, type, or attribute of any of the possessed cards, items and the like is the same as a predetermined one, or the like, for example. Moreover, any criterion may be set.

This enables each user to be more easily associated with a desired user, making it likely to further increase users' wish to continue the game.

In this embodiment, the number of users who can participate in a single battle is not particularly limited. However, the number may be limited. Moreover, multiple groups independent of each other may be managed for a single battle, and, when the number of users participating in a group reaches a threshold value (e.g., twenty users), a new group may be created so that new users can participate in the newly created group. This enables the load to be reduced and/or spread, making it possible to improve the stability, to reduce the operation cost, and the like.

Second Embodiment

In conventional social games, multiple users simply attack an enemy character individually, and the users do not attack an enemy character as a team. In addition, a primary goal of such conventional social games is to defeat an enemy character, and is not for teams to compete with each other. Accordingly, the users are not able to foster a sense of unity as a team, and may no longer wish to continue the game.

In view of such circumstances, this embodiment employs the team system in the progress of a game, and aims at enabling users to foster a sense of unity as a team by putting teams into competition with each other. This makes it possible that, if a user belonging to a team is participating in a game, other users belonging to the same team are willing to participate in the game. Thus, users' wish to continue the game is maintained and/or increased, so that the users maintain their interest in the service.

In this embodiment, multiple users work together to battle against a single enemy character (game character). In addition, multiple teams are formed in advance, and each user belongs to one of the teams at most. In response to an instruction by a user, a corresponding portable device requests the server to initiate a game and let the user participate in a battle. In response to the request from the portable device, the server initiates the game, and lets the user participate in the battle. Moreover, the server makes the battle proceed according to a request from the portable device. When the battle is over, the server calculates the score obtained in the progress of the battle by each of the teams to which the users who have participated in the battle belong, and rewards the users belonging to the team that has obtained the highest score (with a game item, for example). In this way, the users foster a sense of unity as a team, and maintain and/or increase their wish to continue the game.

A game system of this embodiment is the same as the game system 1 illustrated in FIG. 1. In the game system of this embodiment, the portable device 2, which is the same as that illustrated in FIG. 2, is used. However, as a server, a server 8 to be illustrated below with reference to FIG. 8 is used instead of the server 3 illustrated in FIG. 3.

Figure 8:
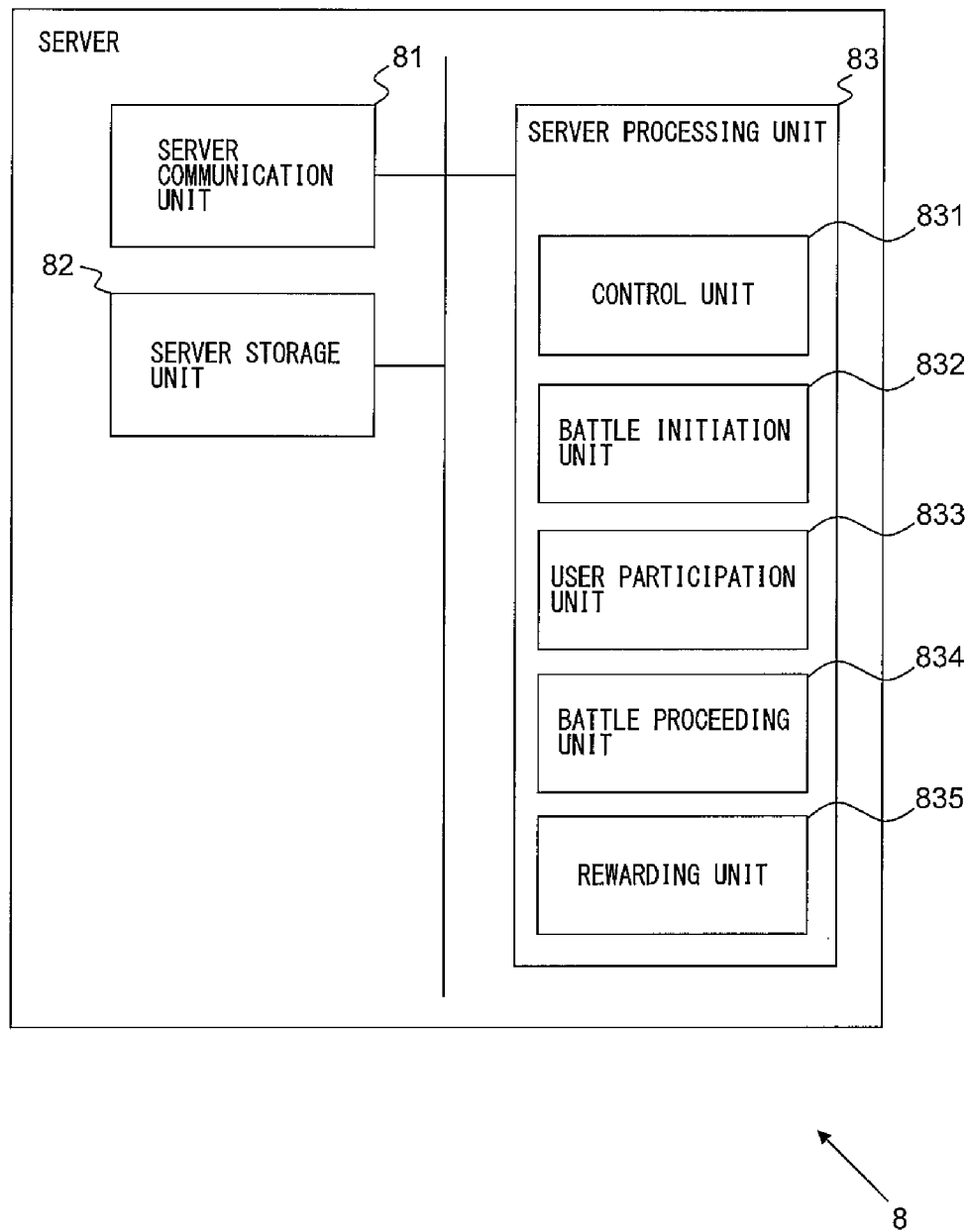
FIG. 8 illustrates an example of a schematic configuration of the server.

FIG. 8 illustrates an example of a schematic configuration of the server 8.

The server 8 proceeds the game in response to a request from the portable device 2. The server 8 generates the display data relating to the progress of the game, and transmits the generated display data to the portable device 2. In order to implement the foregoing functions, the server 8 includes a server communication unit 81, a server storage unit 82, and a server processing unit 83.

The server communication unit 81 includes a communication interface circuit for connecting the server 8 to the Internet 7, and communicates with the Internet 7. The server communication unit 81 supplies the data received from the portable device 2 or the like to the server processing unit 83. The server communication unit 81 transmits the data supplied from the server processing unit 83 to the portable device 2 or the like.

The server storage unit 82 includes at least one of a magnetic tape device, a magnetic disk device and an optical disk device, for example. The server storage unit 82 stores an operating system program, a driver program, an application program, data, and the like used for processing in the server processing unit 83. The server storage unit 82 stores for example, a game program and the like for advancing the game and generating display data relating to its result, as the application program. The server storage unit 82 stores, as the data, a battle table (FIG. 9a) for managing battles, an enemy table (FIG. 9b) for managing enemy characters, a user table (FIG. 9c) for managing users, a card table (FIG. 9d) for managing cards, an item table (FIG. 9e) for managing items, and a team table (FIG. 9f) for managing teams, and the like. Further, the server storage unit 82 may store temporary data relating to certain processing.

FIGS. 9a to 9f illustrate examples of data structures of the various types of tables.

FIG. 9a illustrates an example of the data structure of the battle table. The battle table includes, for each battle, an identification number (ID) of the battle, a name, end time and date, an ID and health point parameter (current value) of the enemy character, IDs and the numbers of attacks of the participating users, IDs of items to be given as rewards, and the like.

FIG. 9b illustrates an example of the data structure of the enemy table. The enemy table includes, for each enemy character, an ID of the enemy character, a name, a file name of image data, parameters such as attack power, defense power, and health point (initial value), and the like.

FIG. 9c illustrates an example of the data structure of the user table. The user table includes, for each user, an ID of the user, a name, a file name of image data, a parameter such as health point, IDs of possessed cards, IDs and health point parameters (current values) of possessed cards which form a deck, IDs of possessed items, a team ID to which the user belongs, and the like.

FIG. 9d illustrates an example of the data structure of the card table. The card table includes for each card, an ID of the card, a name, a file name of image data, parameters such as attack power, defense power, and health point (initial value), and the like.

FIG. 9e illustrates an example of the data structure of the item table. The item table includes for each item, an ID of the item, a name, a file name of image data, and the like.

FIG. 9f illustrates an example of the data structure of the team table. The team table includes for each team, an ID of the team, IDs of the users who belong to the team, and the like.

The server processing unit 83 includes one or more processors and their peripheral circuits. The server processing unit 83 is for example, a CPU, and integrally controls an overall operation of the server 8. The server processing unit 83 controls an operation of the server communication unit 81 or the like so that various types of processing of the server 8 are performed in an appropriate order in accordance with the programs stored in the server storage unit 82. The server processing unit 83 executes processing based on the programs stored in the server storage unit 82 (the operating system program, the driver program, the application program and the like). The server processing unit 83 can execute the multiple programs (the application program and the like) in parallel.

FIG. 10 illustrates an overview of progress of the game.

In FIG. 10, teams A to C are depicted. Users a to c belong to the team A, users d and e belong to the team B, and users f to h belong to the team C. The users a and c from the team A, the user d from the team B, and the user f from the team C are participating in the battle, and are individually attacking the enemy character. In addition, the user b belonging to the team A is about to participate in the battle.

It should be noted that the number of users who can belong to a team is not limited to any of the above, and the number of users who can participate in a battle and/or the number of teams which can participate in a battle is not limited to any of the above, either. However, upper limits may be set for these numbers. For example, multiple spaces independent of each other may be managed for a single battle, and, when the number of users and/or the number of teams participating in a space reaches a threshold value (e.g., ten users and/or two teams), a new space may be created so that new users can participate in the newly created space.

Each user not participating in the battle can participate in the battle when the user desires. To participate in the battle, the user issues an instruction to participate in the battle, on a battle selection screen (FIG. 11a) displayed on the portable device 2 upon initiation of the battle, or on a help demand screen (FIG. 11c) displayed on the portable device 2 when any of the users participating in the battle has demanded help.

Each of these screens also displays information on the battle (e.g., the name and the end time and date of the battle, the names of items to be given as rewards, the names of the users belonging to the same team and participating in the battle, the number of other teams participating in the battle, and the like). On the basis of the display, each user not participating in the battle can determine whether or not to participate in the battle.

FIGS. 11a to 11d illustrate examples of display screens of the portable device 2.

Figure 11A:
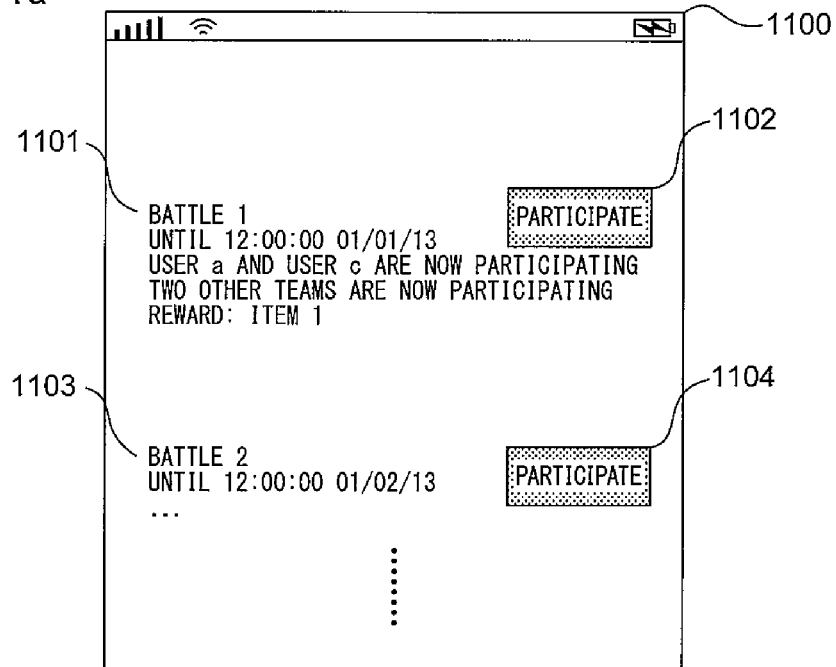
FIGS. 11a to 11d illustrate examples of display screens of the portable device.

FIG. 11a illustrates a battle selection screen 1100 displayed on the portable device 2 of the user b when the user b has initiated a battle. The battle selection screen 1100 is displayed on the basis of screen display data for battle selection received from the server 8. For each battle, text 1101 or 1103 indicating the state of the corresponding battle is displayed on a left part of the screen, while a "participate" button 1102 or 1104 is displayed on a right part of the screen. When the "participate" button 1102 or 1104 is pressed, participation in the corresponding battle is requested to the server 8 via the device communication unit 21.

Figure 11B:
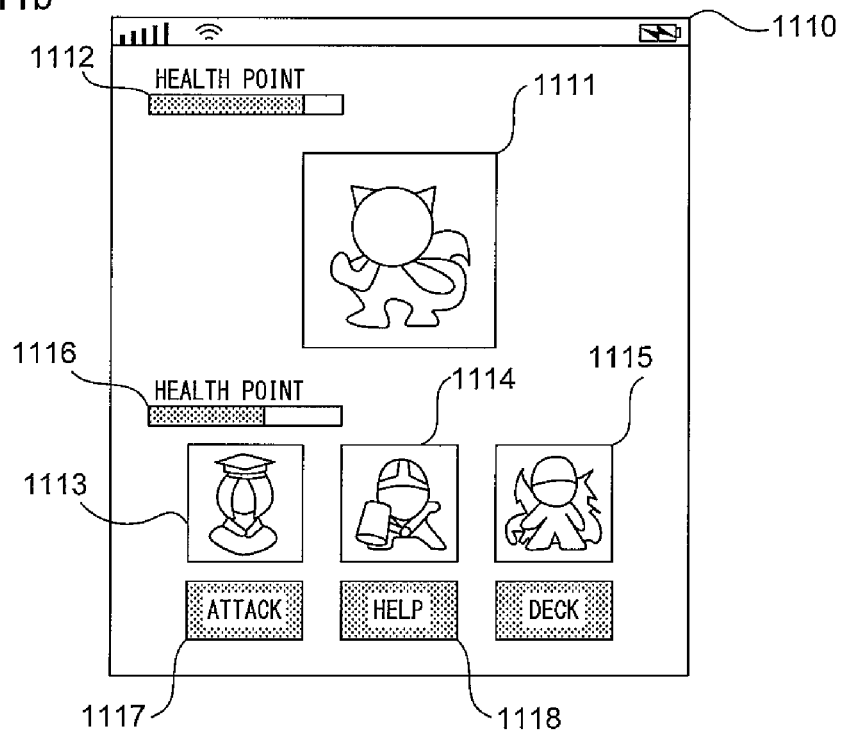
Figure 11C:
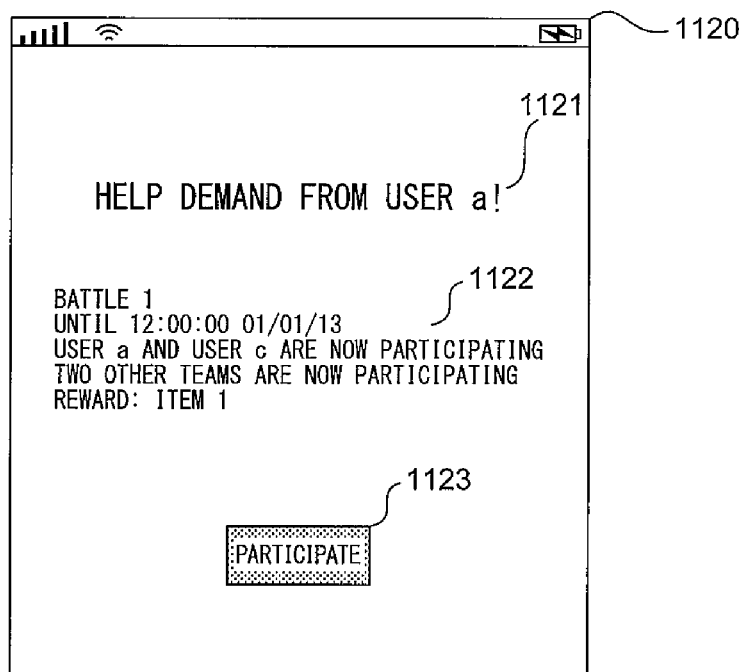

FIG. 11c illustrates a help demand screen 1120 displayed on the portable device 2 of the user b when the user a participating in the battle has demanded help. The help demand screen 1120 is displayed on the basis of the screen display data for demanding help received from the server 8. Text 1121 indicating that the user belonging to the same team has demanded help is displayed on an upper part of the screen, text 1122 indicating the current state of the battle is displayed on a central part of the screen, and a "participate" button 1123 is displayed on a lower part of the screen. When the "participate" button 1123 is pressed, participation in the battle is requested to the server 8 via the device communication unit 21.

On the portable device 2 of each user participating in the battle, an image of the same enemy character, images of the cards which form the deck of the user, and the like are displayed (FIG. 11*b*). The user issues instructions while referring to the display, to make the battle proceed.

FIG. 11*b* illustrates a battle screen 1110 displayed on the portable device 2 of each user (e.g., the user a) participating in the battle. The battle screen 1110 is displayed on the basis of the battle screen display data received from the server 8. An image 1111 and a health point parameter gauge 1112 of the enemy character are displayed on an upper part of the screen, while images 1113 to 1115 of the cards which form the deck and a health point parameter gauge 1116 of the user are displayed on a lower part of the screen. In addition, multiple buttons are also displayed on the lower part of the screen. When an "attack" button 1117 is pressed, execution of an attack is requested to the server 8 via the device communication unit 21. When a "help" button 1118 is pressed, demand for help is requested to the server 8 via the device communication unit 21.

Each of the users and the enemy character alternately attack each other, and the battle ends when the health point parameter value of the cards which form the deck has fallen to 0, or when the health point parameter value of the enemy character has fallen to 0. When the health point parameter value of the enemy character has fallen to 0 and the enemy character is defeated, the score of each of the teams A to C is calculated. The score of each team is calculated on the basis of the degree of contribution to the progress of the battle by the respective users belonging to the team, for example. Assume that the score of each team corresponds to the total number of attacks by the respective users belonging to the team. As to the team A, the number of attacks by the user a is 10 and the number of attacks by the user c is 5, the total number of attacks is 15, and hence the score is 15. Similarly, the score of the team B is 5, and the score of the team C is 10. Consequently, the team A wins, and the users a and c belonging to the team A are rewarded.

A method to calculate the score of each team is not limited to this, and may be any other calculation method. For example, as a method of calculating the score of each team, the degrees of contribution to the progress of the battle by the respective users may be weighted according to the attribute or the like of the users and then added up, instead of simply calculating the total of the degrees of contribution. Moreover, as the degree of contribution to the progress of the battle, the number of times the user has participated in the battle, the amount of reduction in the health point parameter value of the enemy character, the number of times the user has used the items, or the like, or a combination of these may be used rather than the number of attacks. Alternatively, any other criterion may be used instead of the degree of contribution to the progress of the battle. Furthermore, any criterion may be set.

Figure 11D:
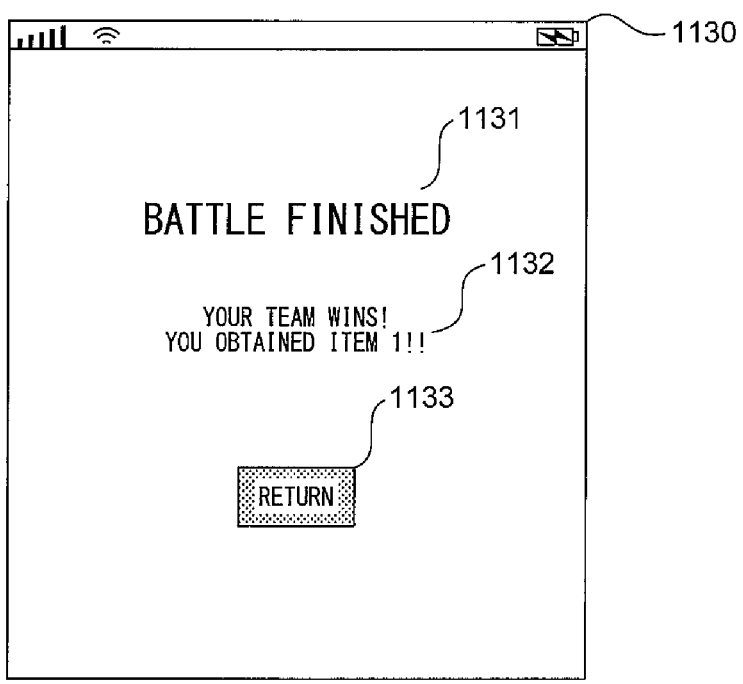

FIG. 11*d* illustrates a battle end screen 1130 displayed on the portable device 2 of each user (e.g., the user a) belonging to the winning team. The battle end screen 1130 is displayed on the basis of the screen display data for battle end received from the server 8. Text 1131 indicating that the battle is over is displayed on an upper part of the screen, text 1132 indicating that the team to which the user belongs has won and the user has obtained an item is displayed on a central part of the screen, and a "return" button 1133 is displayed on a lower part of the screen. When the "return" button 1133 is pressed, changing to the battle selection screen is requested to the server 8 via the device communication unit 21.

It should be noted that the present invention is not limited to this. For example, when the health point parameter value of the cards which form the deck of any user participating in the battle has fallen below a threshold value (e.g., two-third of the upper-limit value) while the battle is proceeding, help may be demanded to the different users automatically. A demand for help may be instructed in the same procedure as that for the case in which a demand for help is explicitly instructed by a user participating in the battle.

Alternatively, irrespective of whether the request is instructed manually or automatically, when participation in the battle is requested by different users within a predetermined time period after the help is demanded to the different users, the different users may be given different rewards (e.g., an item, a card, or an action on the enemy character (e.g., a change of a parameter such as the attribute, the state, or the like)). Moreover, the different rewards may vary according to the order in which the different users participate in the battle.

For example, a different user who has participated in the battle first may be rewarded with a rare item, card, or the like, a different user who has participated in the battle next may be rewarded with an ordinary item, card or the like, and different users who have participated in the battle subsequently may not be rewarded.

Alternatively, a different user who has participated in the battle first is enabled to activate an action that is a weak point of the enemy character, while different users who have participated in the battle subsequently are not enabled to activate this action.

To implement the above-illustrated functions, the server processing unit 83 includes a control unit 831, a battle initiation unit 832, a user participation unit 833, a battle proceeding unit 834, and a rewarding unit 835. Each of the units is a functional module implemented by a program to be executed by the processor included in the server processing unit 83. Alternatively, each of the units may be provided as a firmware on the server 8.

In the following, processing by the control unit 831 will be illustrated.

The control unit 831 controls the progress of the game, and instructs each of the battle initiation unit 832, the user participation unit 833, the battle proceeding unit 834, and the like to perform processing, as appropriate.

The control unit 831 interprets, when receiving a user authentication request from the portable device 2 via the server communication unit 81, the received user authentication request to retrieve the user ID and the password. The control unit 831 instructs a user authentication unit (not illustrated) to perform corresponding processing, using the retrieved user ID and password as parameters.

When the user authentication unit has authenticated the user, the control unit 831 instructs the battle initiation unit 832 to perform corresponding processing, using the retrieved user ID as a parameter.

The control unit 831 transmits screen display data for battle selection which has been returned by the battle initiation unit 832, to the portable device 2 via the server communication unit 81.

Moreover, the control unit 831 instructs, when receiving a battle participation request from the portable device 2 via the server communication unit 81, the user participation unit 833 to perform corresponding processing, using the received battle participation request as a parameter.

The control unit 831 transmits the battle screen display data which has been returned by the user participation unit 833, to the portable device 2 via the server communication unit 81.

Furthermore, the control unit 831 instructs, when receiving a battle proceeding request from the portable device 2 via the server communication unit 81, the battle proceeding unit 834 to perform corresponding processing, using the received battle proceeding request as a parameter.

The control unit 831 transmits the battle screen display data which has been returned by the battle proceeding unit 834, and the like, to the corresponding portable device 2 via the server communication unit 81.

In the following, processing by the battle initiation unit 832 will be illustrated.

The battle initiation unit 832 creates screen display data for battle selection. Specifically, the battle initiation unit 832 refers to the battle table stored in the server storage unit 82, and retrieves each battle with the end time and date which have not passed yet. Then, the battle initiation unit 832 extracts the ID, the name, the end time and date, and the item ID of the retrieved battle. The battle initiation unit 832 refers to the item table stored in the server storage unit 82, using the extracted item ID as a key, and thereby extracts the name of the corresponding item.

Moreover, the battle initiation unit 832 extracts the ID of each user participating in the retrieved battle. The battle initiation unit 832 refers to the user table stored in the server storage unit 82, using the extracted user ID as a key, and thereby extracts the ID of the team to which the corresponding user belongs. Similarly, the battle initiation unit 832 refers to the user table stored in the server storage unit 82, using the provided user ID as a key, and thereby extracts the ID of the team to which the corresponding user belongs. Then, the battle initiation unit 832 compares the team ID of the user corresponding to the provided user ID with each of the extracted team IDs to retrieve each team ID matching with the team ID of the user corresponding to the provided user ID, and then retrieves the user IDs corresponding to the retrieved matching team ID. The battle initiation unit 832 refers to the user table stored in the server storage unit 82, using each retrieved user ID as a key, and thereby extracts the name of the corresponding user.

Further, the battle initiation unit 832 compares the team ID of the user corresponding to the provided user ID with each of the extracted team IDs to retrieve each team ID not matching with the team ID of the user corresponding to the provided user ID.

Thereafter, the battle initiation unit 832 creates screen display data for battle selection which includes the extracted battle IDs, the provided user ID, and the like, and which is for displaying, in a predetermined layout, for each extracted battle ID, text indicating the current state of the corresponding battle (e.g., the name, the end time and date, the name of each item to be given as a reward, the names of the users belonging to the same team and participating in the battle, the number of other teams participating in the battle, and the like), a button for receiving an instruction to participate in the battle, and the like.

The battle initiation unit 832 returns the created screen display data for battle selection to the control unit 831, and then terminates the processing.

In the following, the processing by the user participation unit 833 will be illustrated.

The user participation unit 833 lets the user to participate in a battle. Specifically, the user participation unit 833 interprets the provided battle participation request, to retrieve the battle ID and the user ID. In addition, the user participation unit 833 refers to the battle table stored in the server storage unit 82, using the retrieved battle ID as a key, and thereby retrieves a corresponding battle. Then, the user participation unit 833 adds the retrieved user ID to the IDs of the users participating in the retrieved battle.

The user participation unit 833 creates battle screen display data. Specifically, the user participation unit 833 extracts the ID and the health point parameter of an enemy character of the retrieved battle. The user participation unit 833 refers to the enemy table stored in the server storage unit 82, using the extracted enemy ID as a key, and thereby extracts the file name of the image data of the corresponding enemy character.

Moreover, the user participation unit 833 refers to the user table stored in the server storage unit 82, using the retrieved user ID as a key, and thereby extracts the health point parameter of the corresponding user and the IDs of possessed cards which form a deck of the corresponding user. The user participation unit 833 refers to the card table stored in the server storage unit 82, using the extracted card ID as a key, and thereby extracts the file name of the image data of a corresponding card.

Then, the user participation unit 833 creates battle screen display data which includes the retrieved battle ID and the retrieved user ID, and the like, and which is for displaying, in a predetermined layout, the extracted health point parameter of the enemy character, the extracted health point parameter of the user, the image indicated by the extracted file name, buttons such as a button for receiving an instruction to execute an attack and a button for receiving an instruction to demand help, and the like.

The user participation unit 833 returns the created battle screen display data to the control unit 831, and then terminates the processing.

In the following, the processing by the battle proceeding unit 834 will be illustrated.

The battle proceeding unit 834 determines whether or not the end time and date of the battle have passed. Specifically, the battle proceeding unit 834 interprets the provided battle proceeding request to retrieve the battle ID, the content of the instruction, and the user ID. In addition, the battle proceeding unit 834 refers to the battle table stored in the server storage unit 82, using the retrieved battle ID as a key, and retrieves a corresponding battle. Then, the battle proceeding unit 834 determines whether or not the end time and date of the retrieved battle have passed.

When the end time and date of the retrieved battle have not passed yet, the battle proceeding unit 834 makes the battle proceed according to the retrieved content of the instruction. Specifically, when the retrieved content of the instruction indicates "execution of an attack", the battle proceeding unit 834 executes attack processing.

For example, the battle proceeding unit 834 extracts the ID and the health point parameter of the enemy character of the retrieved battle. Moreover, the battle proceeding unit 834 refers to the enemy table stored in the server storage unit 82, using the extracted enemy ID as a key, and thereby extracts parameters indicating the attack power, the defense power, and the like of the corresponding enemy character.

Similarly, the battle proceeding unit 834 refers to the user table stored in the server storage unit 82, using the retrieved user ID as a key, and thereby retrieves a corresponding user. Then, the battle proceeding unit 834 extracts the IDs and the health point parameters of the possessed cards which form the deck of the retrieved user. Moreover, the battle proceeding unit 834 refers to the card table stored in the server storage unit 82, using each extracted card ID as a key, and thereby extracts the parameters indicating the attack power, the defense power, and the like of the corresponding card.

Thereafter, the battle proceeding unit 834 carries out a simulation of the battle on the basis of the extracted parameters of the enemy character and the extracted parameters of the cards. For example, on the basis of the attack power parameter values of the cards and the defense power parameter value of the enemy character, the health point parameter value of the enemy character is reduced. Similarly, on the basis of the attack power parameter value of the enemy character and the defense power parameter values of the cards, the health point parameter values of the cards are reduced.

The battle proceeding unit 834 updates the health point parameter of the enemy character of the retrieved battle. In addition, the battle proceeding unit 834 increments (by 1) the number of attacks of the user corresponding to the retrieved user ID, among the users participating in the retrieved battle. Similarly, the battle proceeding unit 834 updates the health point parameters of the possessed cards which form the deck of the retrieved user.

The battle proceeding unit 834 determines whether or not the updated health point parameter value of the enemy character is 0. When the updated health point parameter value of the enemy character is not 0, the battle proceeding unit 834 creates battle screen display data.

By contrast, when the updated health point parameter value of the enemy character has fallen to 0, the battle proceeding unit 834 instructs the rewarding unit 835 to perform corresponding processing, using the retrieved battle ID as a parameter.

The battle proceeding unit 834 creates screen display data for battle end. Specifically, the battle proceeding unit 834 refers to the user table stored in the server storage unit 82, using the retrieved user ID as a key, and thereby extracts the ID of the team to which the corresponding user belongs. Then, the battle proceeding unit 834 compares the extracted team ID and the team ID returned by the rewarding unit 835.

When the team IDs match, the battle proceeding unit 834 extracts the ID of the item to be given as a reward in the retrieved battle. Moreover, the battle proceeding unit 834 refers to the item table stored in the server storage unit 82, using the extracted item ID as a key, and thereby extracts the name of the corresponding item.

Thereafter, the battle proceeding unit 834 creates screen display data for battle end which includes the retrieved user IDs and the like, and which is for displaying, in a predetermined layout, text indicating that the battle is over, text indicating that the team to which the user belongs has won and the user has obtained an item (when the team IDs matched), a button for receiving an instruction to change to the battle selection display, and the like.

When the retrieved content of the instruction indicates a "demand for help", the battle proceeding unit 834 creates screen display data for demanding help. Specifically, the battle proceeding unit 834 refers to the user table stored in the server storage unit 82, using the retrieved user ID as a key, and thereby extracts the name of the corresponding user and the ID of the team to which the user belongs. The battle proceeding unit 834 refers to the team table stored in the server storage unit 82, using the extracted team ID as a key, and thereby extracts the ID of each user belonging to the corresponding team.

Moreover, the battle proceeding unit 834 extracts the name, the end time and date, the item IDs of the retrieved battle. The battle proceeding unit 834 refers to the item table stored in the server storage unit 82, using each extracted item ID as a key, and thereby extracts the name of the corresponding item.

The battle initiation unit 832 extracts the ID of each user participating in the retrieved battle. The battle initiation unit 832 refers to the user table stored in the server storage unit 82, using each extracted user ID as a key, and thereby extracts the ID of the team to which the corresponding user belongs. The battle initiation unit 832 compares the extracted team ID and each of the team IDs which have been extracted previously, and retrieves each team ID matching with the extracted team ID. Thereby, the battle initiation unit 832 retrieves user IDs corresponding to the retrieved team ID. The battle initiation unit 832 refers to the user table stored in the server storage unit 82, using the retrieved user ID as a key, and thereby extracts the name of the corresponding user. The battle initiation unit 832 compares the retrieved user ID and each of the user IDs which have been extracted previously, and retrieves each user ID not matching with the retrieved user ID.

Further, the battle initiation unit 832 compares the extracted team ID and each of the team IDs which have been extracted previously, and retrieves each team ID not matching with the extracted team ID.

Then, the battle initiation unit 832 creates, for each retrieved user ID not matching with the retrieved user ID, screen display data for demanding help which includes the retrieved battle ID, the retrieved user IDs not matching with the retrieved user ID, and the like, and which is for displaying, in a predetermined layout, text indicating that a user belonging to the same team has demanded help, the current state of the battle (e.g., the name, the end time and date, the name of each item to be given as a reward, the names of the users belonging to the same team and participating in the battle, the number of other teams participating in the battle, and the like), a button for receiving an instruction to participate in the battle, and the like.

The battle proceeding unit 834 creates battle screen display data.

When the retrieved content of the instruction indicates a different operation, the battle proceeding unit 834 performs corresponding processing according to the retrieved content of the instruction.

When the end time and date of the retrieved battle have already passed, the battle proceeding unit 834 creates screen display data for battle end. Specifically, the battle proceeding unit 834 creates screen display data for battle end which includes the retrieved user IDs and the like, and which is for displaying, in a predetermined layout, text indicating that the battle is over, a button for receiving an instruction to change to the battle selection screen, and the like.

The battle proceeding unit 834 returns the created battle screen display data and the like to the control unit 831, and then terminates the processing.

In the following, the processing by the rewarding unit 835 will be illustrated.

The rewarding unit 835 retrieves the team to which each user participating in the battle belongs. Specifically, the rewarding unit 835 refers to the battle table stored in the server storage unit 82, using the provided battle ID as a key, and retrieves the corresponding battle. Thereby, the rewarding unit 835 extracts the ID and the number of attacks of each user participating in the retrieved battle, and the ID of each item to be given as a reward in the retrieved battle. Moreover, the rewarding unit 835 refers to the user table stored in the server storage unit 82, using each extracted user ID as a key, and thereby extracts the ID of the team to which the corresponding user belongs.

The rewarding unit 835 calculates the score of each retrieved team. Specifically, the rewarding unit 835 adds up the numbers of attacks of the respective users belonging to the team corresponding to the same team ID among the users participating in the retrieved battle, and determines the total number of attacks to be the score of the team.

The rewarding unit 835 rewards the users belonging to the team obtaining the highest one of the calculated scores. Specifically, the rewarding unit 835 refers to the user table stored in the server storage unit 82, using, as a key, the ID of each user belonging to the team obtaining the highest score of the calculated scores, and thereby retrieves the corresponding user. Then, the rewarding unit 835 adds the extracted item ID to the IDs of the items possessed by each retrieved user.

The rewarding unit 835 returns the corresponding team ID to the control unit 831, and then terminates the processing.

Figure 12:
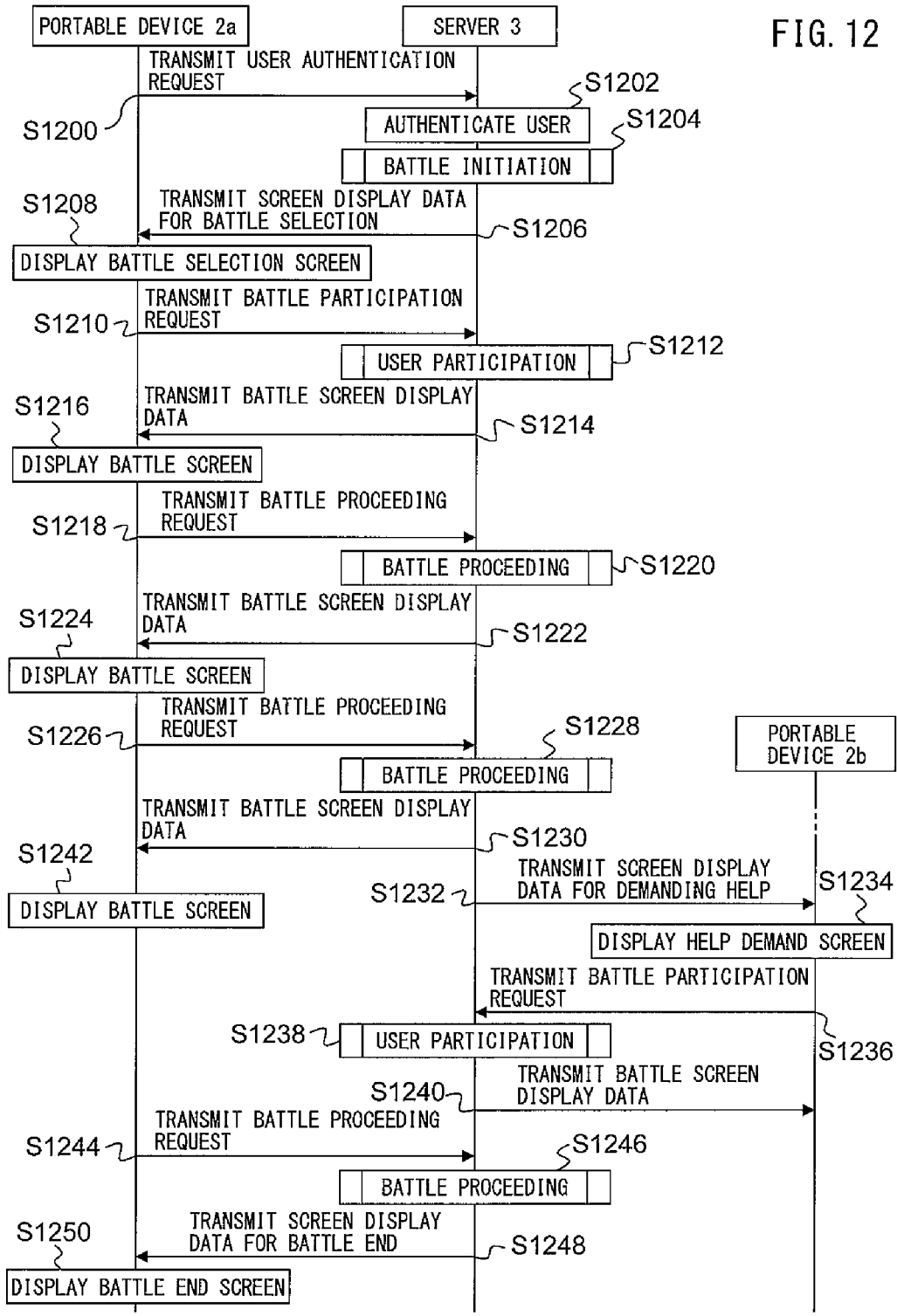
FIG. 12 illustrates an example of an operation sequence of the game system.

FIG. 12 illustrates an example of an operation sequence of the game system of this embodiment. In the operation sequence to be illustrated below, users are referred to as the users a and b, the portable device 2 of the user a is referred to as the portable device 2a while the portable device 2 of the user b is referred to as the portable device 2b. This operation sequence is performed mainly by the device processing units 25a and 25b as well as the server processing unit 83 on the basis of programs previously stored in the device storage units 22a and 22b as well as the server storage unit 82, in cooperation with each of the units in the portable devices 2a and 2b as well as the server 8.

The user a instructs the device processing unit 25a to execute a program for retrieving and displaying display data relating to the progress of the game via the operation unit 23a. The device processing unit 25a initiates performing processing on the basis of this program. Specifically, when the user a has input a user ID and a password via the operation unit 23a, the browsing executing unit 251a to be implemented by the program transmits a user authentication request including the input user ID, password, and the like, to the server 8 via the device communication unit 21a (step S1200).

The control unit 831 interprets, when receiving the user authentication request from the portable device 2a via the server communication unit 81, the received user authentication request, to retrieve the user ID and the password. The control unit 831 instructs the user authentication unit (not illustrated) to perform corresponding processing, using the retrieved user ID and password as parameters (step S1202).

When the user authentication unit has authenticated the user a, the control unit 831 instructs the battle initiation unit 832 to perform corresponding processing, using the retrieved user ID as a parameter (step S1204).

FIGS. 13a to 13d illustrate examples of the operation flows of the respective units in the server processing unit 83.

Figure 13A:
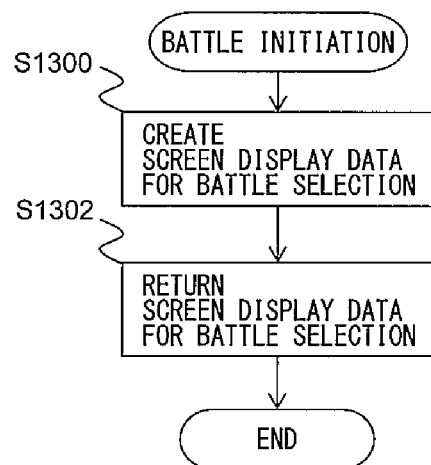
FIGS. 13a to 13d illustrate examples of the operation flows of the server.

FIG. 13a illustrates an example of the operation flow of the battle initiation unit 832.

The battle initiation unit 832 creates screen display data for battle selection (step S1300).

The battle initiation unit 832 returns the created screen display data for battle selection to the control unit 831 (step S1302), and then terminates the processing.

Return to FIG. 12. The control unit 831 transmits the screen display data for battle selection returned by the battle initiation unit 832, to the portable device 2a via the server communication unit 81 (step S1206).

The browsing executing unit 251a creates, when receiving the screen display data for battle selection from the server 8 via the device communication unit 21a, drawing data on the basis of the received screen display data for battle selection. Moreover, the browsing executing unit 251a outputs the created drawing data to the display unit 24a to display a battle selection screen thereon (step S1208).

The browsing executing unit 251a transmits, when being instructed on the battle selection screen to participate in the battle by the user a via the operation unit 23a, a battle participation request including the battle ID corresponding to the battle, the user IDs, and the like included in the received screen display data for battle selection, to the server 8 via the device communication unit 21a (step S1210).

The control unit 831 instructs, when receiving the battle participation request from the portable device 2a via the server communication unit 81, the user participation unit 833 to perform corresponding processing, using the received battle participation request as a parameter (step S1212).

Figure 13B:
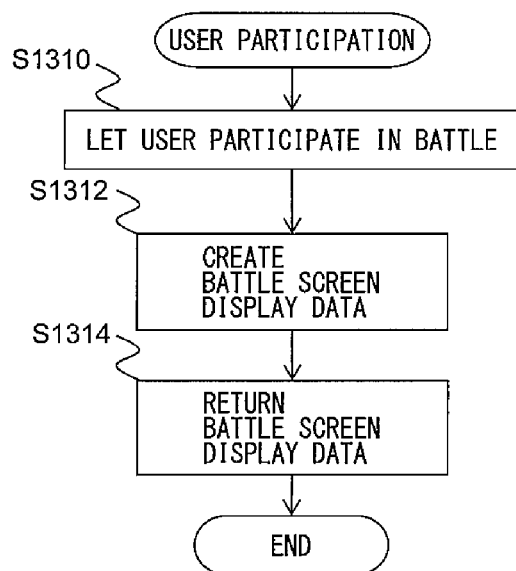

FIG. 13b illustrates an example of the operation flow of the user participation unit 833.

The user participation unit 833 lets the user participate in the battle (step S1310).

The user participation unit 833 creates battle screen display data (step S1312).

The user participation unit 833 returns the created battle screen display data to the control unit 831 (step S1314), and then terminates the processing.

Return to FIG. 12. The control unit 831 transmits the battle screen display data returned by the user participation unit 833, to the portable device 2a via the server communication unit 81 (step S1214).

The browsing executing unit 251a creates, when receiving the battle screen display data from the server 8 via the device communication unit 21a, drawing data on the basis of the received battle screen display data. Moreover, the browsing executing unit 251a outputs the created drawing data to the display unit 24a to display a battle screen thereon (step S1216).

The browsing executing unit 251a transmits, when being instructed on the battle screen to execute an attack by the user a via the operation unit 23a, a battle proceeding request including the battle ID and the user IDs included in the received battle screen display data, and the content of the instruction, "execution of an attack" to the server 8 via the device communication unit 21a (step S1218).

The control unit 831 instructs, when receiving the battle proceeding request from the portable device 2a via the server communication unit 81, the battle proceeding unit 834 to perform corresponding processing, using the received battle proceeding request as a parameter (step S1220).

Figure 13C:
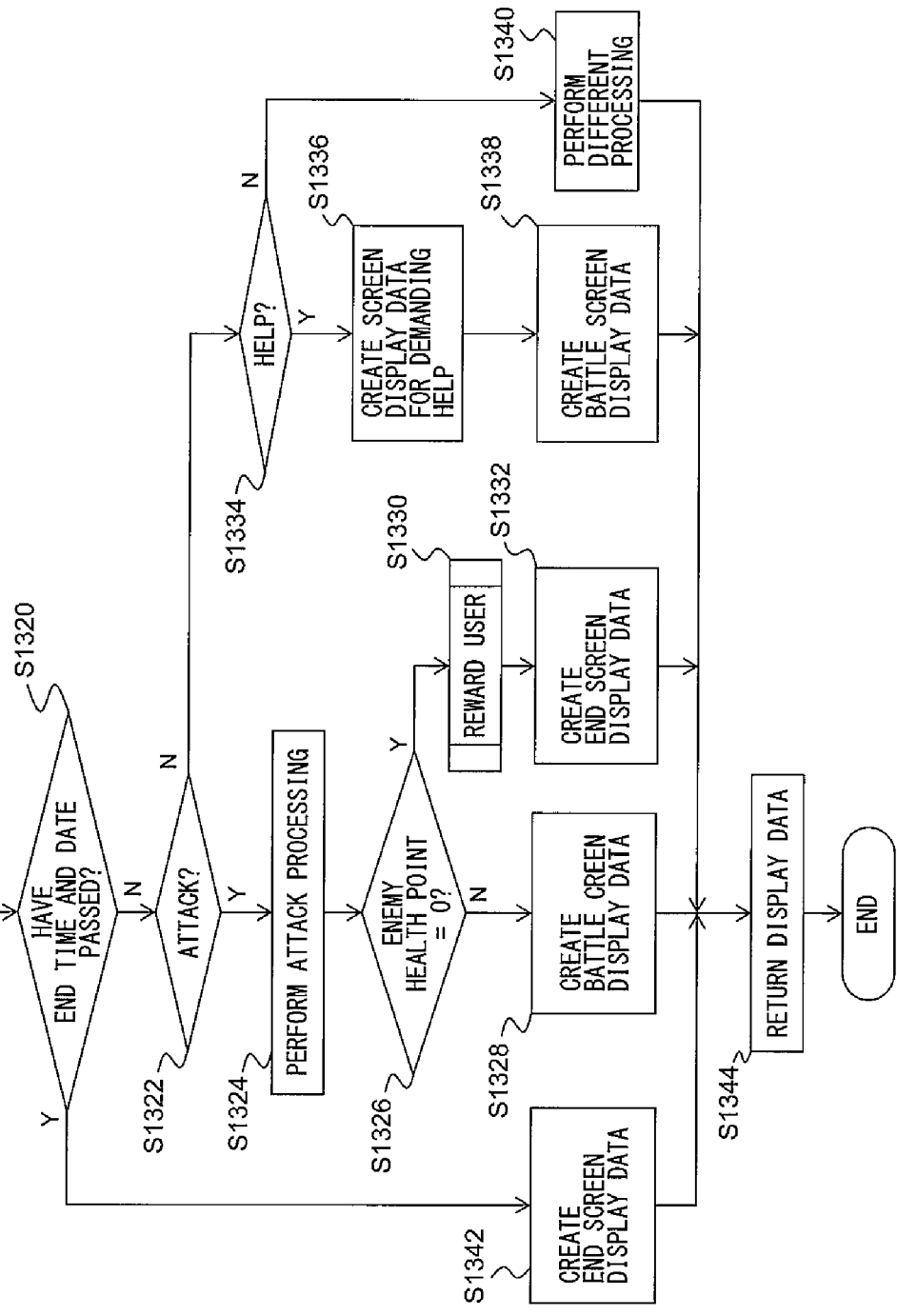

FIG. 13c illustrates an example of the operation flow of the battle proceeding unit 834.

The battle proceeding unit 834 determines whether or not the end time and date of the battle have passed (step S1320).

When the end time and date of the retrieved battle have not passed yet (NO in step S1320), the battle proceeding unit 834 makes the battle proceed according to the retrieved content of the instruction.

Specifically, when the retrieved content of the instruction indicates "execution of an attack" (YES in step S1322), the battle proceeding unit 834 performs attack processing (step S1324).

The battle proceeding unit 834 determines whether or not the updated health point parameter value of the enemy character is 0 (step S1326).

When the updated health point parameter value of the enemy character is not 0 (NO in step S1326), the battle proceeding unit 834 creates battle screen display data (step S1328).

By contrast, when the updated health point parameter value of the enemy character has fallen to 0 (YES in step S1326), the battle proceeding unit 834 instructs the rewarding unit 835 to perform corresponding processing, using the retrieved battle ID as a parameter (step S1330).

Figure 13D:
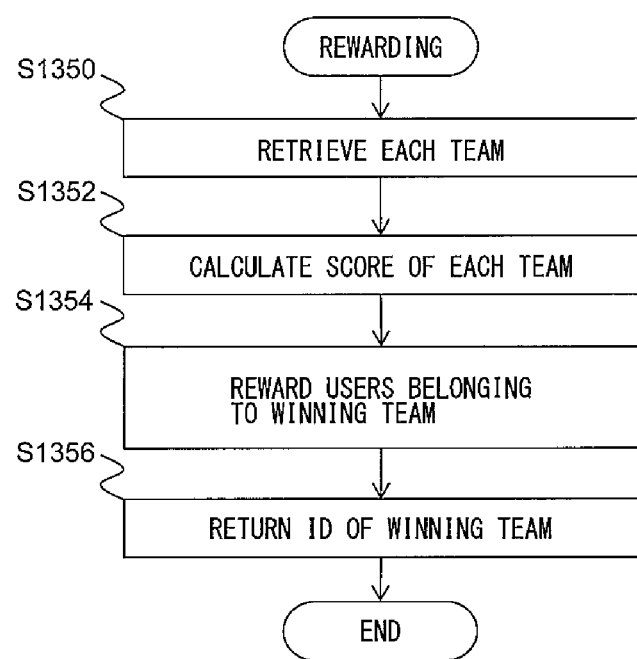

FIG. 13*d* illustrates an example of the operation flow of the rewarding unit 835.

The rewarding unit 835 retrieves the team to which each user participating in the battle belongs (step S1350).

The rewarding unit 835 calculates the score of each retrieved team (step S1352).

The rewarding unit 835 rewards the users belonging to the team obtaining the highest one of the calculated scores (step S1354).

The rewarding unit 835 returns the corresponding team ID to the control unit 831 (step S1356), and then terminates the processing.

Return to FIG. 13*c*. The battle proceeding unit 834 creates screen display data for battle end (step S1332).

When the retrieved content of the instruction indicates a "demand for help" (YES in step S1334), the battle proceeding unit 834 creates screen display data for demanding help (step S1336).

The battle proceeding unit 834 creates battle screen display data (step S1338).

When the retrieved content of the instruction indicates a different operation (NO in step S1334), the battle proceeding unit 834 performs processing according to the retrieved content of the instruction (step S1340).

When the end time and date of the retrieved battle have already passed (YES in step S1320), the battle proceeding unit 834 creates screen display data for battle end (step S1342).

The battle proceeding unit 834 returns the created battle screen display data and the like to the control unit 831 (step S1344), and then terminates the processing.

Return to FIG. 12. When the battle is not over yet, the control unit 831 transmits the created battle screen display data to the portable device 2*a* via the server communication unit 81 (step S1222).

The browsing executing unit 251*a* creates, when receiving the battle screen display data from the server 8 via the device communication unit 21*a*, drawing data on the basis of the received battle screen display data. Moreover, the browsing executing unit 251*a* outputs the created drawing data to the display unit 24*a* to display a battle screen thereon (step S1224).

The browsing executing unit 251*a* transmits, when being instructed on the battle screen to demand help by the user a via the operation unit 23*a*, a battle proceeding request including the battle ID and the user IDs included in the received battle screen display data, and the content of the instruction, a "demand for help" to the server 8 via the device communication unit 21*a* (step S1226).

The control unit 831 instructs, when receiving the battle proceeding request from the portable device 2*a* via the server communication unit 81, the battle proceeding unit 834 to perform corresponding processing, using the received battle proceeding request as a parameter (step S1228).

When the battle is not over yet, the control unit 831 transmits the created battle screen display data to the portable device 2*a* via the server communication unit 81 (step S1230).

Then, the control unit 831 transmits the created screen display data for demanding help to the portable device 2*b* via the server communication unit 81 (step S1232).

The browsing executing unit 251*b* creates, when receiving the screen display data for demanding help from the server 8 via the device communication unit 21*b*, drawing data on the basis of the received screen display data for demanding help. Moreover, the browsing executing unit 251*b* outputs the created drawing data to the display unit 24*b* to display a help demand screen thereon (step S1234).

The browsing executing unit 251*b* transmits, when being instructed on the help demand screen to participate in the battle by the user b via the operation unit 23*b*, a battle participation request including the battle ID, the user IDs, and the like included in the received screen display data for demanding help, to the server 8 via the device communication unit 21*b* (step S1236).

The control unit 831 instructs, when receiving the battle participation request from the portable device 2*b* via the server communication unit 81, the user participation unit 833 to perform corresponding processing, using the received battle participation request as a parameter (step S1238).

The control unit 831 transmits the battle screen display data returned by the user participation unit 833, to the portable device 2*b* via the server communication unit 81 (step S1240).

The browsing executing unit 251*a* creates, when receiving the battle screen display data from the server 8 via the device communication unit 21*a*, drawing data on the basis of the received battle screen display data. Moreover, the browsing executing unit 251*a* outputs the created drawing data to the display unit 24*a* to display a battle screen thereon (step S1242).

The browsing executing unit 251*a* transmits, when being instructed on the battle screen to execute an attack by the user a via the operation unit 23*a*, a battle proceeding request including the battle ID and the user IDs included in the received battle screen display data, and the content of the instruction, "execution of an attack" to the server 8 via the device communication unit 21*a* (step S1244).

The control unit 831 instructs, when receiving the battle proceeding request from the portable device 2*a* via the server communication unit 81, the battle proceeding unit 834 to perform corresponding processing, using the received battle proceeding request as a parameter (step S1246).

When the battle is over, the control unit 831 transmits the created screen display data for battle end to the portable device 2*a* via the server communication unit 81 (step S1248).

The browsing executing unit 251*a* creates, when receiving the screen display data for battle end from the server 8 via the device communication unit 21*a*, drawing data on the basis of the received screen display data for battle end. Moreover, the browsing executing unit 251*a* outputs the created drawing data to the display unit 24*a* to display a battle end screen thereon (step S1250).

As has been illustrated, employing the team system in the progress of the game enables users to compete with each other in teams. This makes it possible for the users to foster a sense of unity as a team, and hence the users' wish to continue the game can be maintained and/or increased, so that the users can maintain their interest in the service.

It should be noted that the present invention is not limited to these embodiments. For example, in these embodiments, the present invention is applied to a card battle game. However, the present invention may be applied to any game or service having other similar structure without being limited to a card battle game.

A computer program for causing a computer to execute the respective functions of the device processing unit 25 and the server processing units 33 and 83 may be provided in a form recorded on a computer readable recording medium such as a magnetic recording medium or an optical recording medium.

The preceding description has been presented only to illustrate and describe exemplary embodiments of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

The invention claimed is:

1. A method for controlling a server for providing a game to a plurality of terminal devices used by respective users of a plurality of users to participate in the game, the server including a memory for storing battle data relating to battles proceeding in the game and user data relating to the plurality of users, the method comprising:
   transmitting data, over a computer network, for displaying a battle list including information related to a plurality of battles for the game, to the terminal devices of the plurality of users, the plurality of battles including historical battles;
   in response to receiving a request to participate in a battle selected from the plurality of battles from a terminal device of any one of the plurality of users, storing a user using said terminal device as a participating user in the memory, and transmitting data for displaying a battle screen including information relating to the battle to said terminal device, the battle being a current battle;
   executing the battle and monitoring the battle, in response to receiving a request to proceed with the battle from the terminal device of the user participating in the battle;
   for each user, storing information on a certain operation which is performed by said each user in the battle, as a degree of contribution to the battle, in the memory;
   when the battle is over, automatically selecting from the plurality of users, using circuitry, one or more candidate users who have participated in the battle and whose degree of contribution to the battle is larger than a threshold value;
   transmitting, over the computer network, to a terminal device of a user who has participated in the battle, data for displaying a selection screen in which the automatically selected one or more candidate users, with whom the user may establish a friend status, are displayed in descending order according to predetermined criteria; and
   allowing said user who has participated in the battle to select whether or not the terminal device of said user transmits, over the computer network, an association request to associate at least one first candidate selected from the one or more candidate users by said user with said user to the server, wherein
   the selection screen includes, for each of the one or more candidate users, a selection element used for selecting at least one corresponding candidate as the first candidate, and for transmitting the association request over the computer network.

2. The method according to claim 1, wherein when an association process is performed based on the association request, only the automatically selected users on the basis of a predetermined criterion are displayed.

3. The method of claim 1, wherein the predetermined criteria is a degree of contribution to the battle, wherein the degree of contribution is a number of times each displayed user has participated in the battle.

4. The method according to claim 1, wherein the users participating in the battle are not associated with each other before the battle ends.

5. The method according to claim 1, wherein, when the battle is over, the server associates information pieces for each user who achieve a degree of contribution to progress of the battle which is larger than a threshold value, and stores the associated information pieces in the memory to associate the users who have participated in the battle with each other.

6. A non-transitory computer-readable recording medium having recorded thereon a program for controlling a server for providing a game to a plurality of terminal devices used by respective users of a plurality of users to participate in the game, the server including a memory for storing battle data relating to battles proceeding in the game and user data relating to the plurality of users, the program causing the server to execute a process, the process comprising:
   transmitting data, over a computer network, for displaying a battle list including information related to a plurality of battles for the game, to the terminal devices of the plurality of users, the plurality of battles including historical battles;
   in response to receiving a request to participate in a battle selected from the plurality of battles from a terminal device of any one of the plurality of users, storing a user using said terminal device as a participating user in the memory, and transmitting data for displaying a battle screen including information relating to the battle to said terminal device, the battle selected a current battle;
   executing the battle and monitoring the battle, in response to receiving a request to proceed with the battle from the terminal device of the user participating in the battle;
   for each user, storing information on a certain operation which is performed by said each user in the battle, as a degree of contribution to the battle, in the memory;
   when the battle is over, automatically selecting from the plurality of users, one or more candidate users who have participated in the battle and whose degree of contribution to the battle is larger than a threshold value;
   transmitting, over the computer network, to a terminal device of a user who has participated in the battle, data for displaying a selection screen in which the automatically selected one or more candidate users, with whom the user may establish a friend status, are displayed in descending order according to predetermined criteria; and
   allowing said user who has participated in the battle to select whether or not the terminal device of said user transmits, over the computer network, an association request to associate at least one first candidate selected from the one or more candidate users by said user with said user to the server, wherein
   the selection screen includes, for each of the one or more candidate users, a selection element used for selecting at least one corresponding candidate as the first candidate, and for transmitting the association request over the computer network.

7. A server for providing a game to a plurality of terminal devices used by respective users of a plurality of users to participate in the game, the server comprising:
- a memory for storing battle data relating to battles proceeding in the game and user data relating to the plurality of users; and
- circuitry configured to
- communicate with a terminal device of each of the plurality of users, over a computer network;
- transmit data, over the computer network, for displaying a battle list including information related to a plurality of battles for the game, to the terminal devices of the plurality of users, the plurality of battles including historical battles;
- allow a user using a respective terminal device to participate in the battle, in response to receiving a request to participate in a battle selected from the plurality of battles from a terminal device of any one of the plurality of users, wherein a user using said terminal device is stored as a participating user in the memory, and wherein the circuitry transmits data for displaying a battle screen including information relating to the battle to said terminal device, the battle being a current battle;
- make the battle proceed, in response to receiving a request to proceed with the battle from the terminal device of any one of the plurality of users participating in the battle;
- automatically select from the plurality of users, one or more candidate users who have participated in the battle and whose degree of contribution to the battle is larger than a threshold value, when the battle is over;
- transmit, over the computer network, to a terminal device of a user who has participated in the battle, data for displaying a selection screen in which the automatically selected one or more candidate users, with whom the user may establish a friend status, are displayed in descending order according to predetermined criteria; and
- allow said user who has participated in the battle to select whether or not the terminal device of said user transmits, over the computer network, an association request to associate at least one first candidate selected from the one or more candidate users by said user with said user to the server, wherein
- the selection screen includes, for each of the one or more candidate users, a selection element used for selecting at least one corresponding candidate as the first candidate, and for transmitting the association request over the computer network.

8. A server device for providing a game to a plurality of terminal devices used by respective users of a plurality of users to participate in the game, the server device comprising:
- a storage for storing battle data relating to battles proceeding in the game and user data relating to the plurality of users; and
- processing circuitry configured to:
- communicate with a terminal device of each of the plurality of users, over a computer network,
- transmit data, over a computer network, for displaying a battle list including information related to a plurality of battles for the game, to the terminal devices of each of the plurality of users, the plurality of battles including historical battles,
- allow a user using a respective terminal device to participate in the battle, in response to receiving a request to participate in a battle selected from the plurality of battles from a terminal device of any one of the plurality of users, wherein a user using said terminal device is stored as a participating user in the storage, and wherein said processing circuitry is further configured to transmit data for displaying a battle screen including information relating to the battle to said terminal device, the battle being a current battle,
- make the battle proceed, in response to receiving a request to proceed with the battle from the terminal device of any one of the plurality of users participating in the battle, and
- automatically select one or more candidate users who have participated in the battle and whose degree of contribution to the battle is larger than a threshold value, when the battle is over, wherein
- the processing circuitry is further configured to transmit, over the computer network, to a terminal device of a user who has participated in the battle, data for displaying a selection screen in which the automatically selected one or more candidate users, with whom the user may establish a friend status, are displayed in descending order according to predetermined criteria,
- the processing circuitry is further configured to allow the user who has participated in the battle to select whether or not the terminal device of said user transmits, over the computer network, an association request to associate at least one first candidate selected from the one or more candidate users by said user with said user to the server device, and
- the selection screen includes, for each of the one or more candidate users, a selection element used for selecting at least one corresponding candidate as the first candidate, and for transmitting the association request over the computer network.

9. A system comprising a server for providing a game to a plurality of terminal devices used by respective users of a plurality of users to participate in the game, and a terminal device of each of the plurality of users provided with the game,
the server including:
- a memory for storing battle data relating to battles proceeding in the game and user data relating to the plurality of users; and
- first circuitry configured to communicate with the terminal device of each of the plurality of users, over a computer network;
- transmit data, over the computer network, for displaying a battle list including information related to a plurality of battles for the game, to the terminal devices of the plurality of users, the plurality of battles including historical battles;
- allow a user using a respective terminal device to participate in the battle, in response to receiving a request to participate in a battle selected from the plurality of battles from a terminal device of any one of the plurality of users, wherein a user using said terminal device is stored as a participating user in the memory, and wherein the first circuitry transmits data for displaying a battle screen including information relating to the battle to said terminal device, the battle being a current battle;
- make the battle proceed, in response to receiving a request to proceed with the battle from the terminal device of any one of the plurality of users participating in the battle; and automatically select from the plurality of users, one or more candidate users who have participated in the battle and whose degree of contribution to the battle is larger than a threshold value, when the battle is over;

transmit, over the computer network, to a terminal device of a user who has participated in the battle, data for displaying a selection screen in which the automatically selected one or more candidate users, with whom the user may establish a friend status are displayed in descending order according to predetermined criteria; and allow said user who has participated in the battle to select whether or not the terminal device of said user transmits, over the computer network, an association request to associate at least one first candidate selected from the one or more candidate users by said user with said user to the server, and the terminal device including:

second circuitry configured to communicate with the server;

receive the data for displaying the battle; and transmit, to the server, the request to participate in one of the battles and the request to proceed with the battle, wherein the selection screen includes, for each of the one or more candidate users, a selection element used for selecting at least one corresponding candidate as the first candidate, and for transmitting the association request over the computer network.

10. A method for controlling a server for providing a game in which a plurality of users participate, to battle against a game character, to a plurality of terminal devices respectively used by the plurality of users, the server including a memory for storing team data indicating teams to which each of the plurality of users belong, participation data indicating which user is participating in the game, a first parameter value of each of the plurality of users, and a second parameter value of the game character, the method comprising:

in response to receiving a request to participate in a battle proceeding in the game from a terminal device of any one of the plurality of users, storing a user using the terminal device as a participating user in the memory, and transmitting data, over a computer network, for displaying a battle screen including information relating to the battle to said terminal device;

executing the battle with which said participating user uses the first parameter value for proceeding, to reduce at least one of the first parameter value of said participating user and the second parameter value of said game character, and monitoring the battle, in response to receiving a request to proceed with the battle from said terminal device;

in response to the first parameter value of said participating user falling below a threshold value, retrieving said participation data for other user different from said participating user, the other user belonging to a team to which said participating user belongs and is not participating in the battle;

transmitting, to a terminal device of said other user, over the computer network, data for displaying a request screen for requesting said other user to participate in the battle, the request screen including information on a reward which a user can obtain when the battle is over and information on users participating in the battle; and allowing, using circuitry, said other user to participate in the battle, in response to receiving a request to participate in the battle from the terminal device of said other user, wherein the plurality of users are displayed on the battle screen in accordance with predetermined criteria.

11. The method according to claim 10, further comprising:

retrieving, in response to receiving a request to initiate the game from a terminal device of a first user of the plurality of users, information about the team data indicating a team to which the first user belongs, and a different user belonging to the team to which the first user belongs; and transmitting an information piece on the retrieved different user, to the terminal device of the first user.

12. The method according to claim 11, further comprising transmitting an information piece on the reward, to the terminal device of the first user.

13. The method according to claim 11, further comprising transmitting, to the terminal device, an information piece on a second team different from the team to which the first user belongs.

14. The method according to claim 10, wherein, in response to receiving the request to participate in the battle from the terminal device of said other user, within a predetermined time period after transmitting a request to invite said other user to participate in the battle to the terminal device of said other user, the server lets said other user participate in the game, and gives said other user a different reward from the reward.

15. The method according to claim 10, wherein the server further transmits, to the terminal device of said other user, an information piece on a second team different from the team to which said participating user belongs.

16. The method according to claim 10, wherein, the server calculates, for each of the teams to which said participating users belong, a score relating to progress of the battle, on the basis of a degree of contribution to the progress of the battle made by the users belonging to the teams.

17. The method according to claim 10, further comprising:

calculating a score relating to progress of the battle for each of the teams participating in the battle; and providing a reward to each of the users belonging to a team obtaining a highest one of the calculated scores, in response to the first parameter value falling below the threshold value.

18. A non-transitory computer-readable recording medium having recorded thereon a program for controlling a server for providing a game, in which a plurality of users participate and a second parameter value of a game character is reduced, the server including a memory for storing team data indicating teams to which each of the plurality of users belong, participation data indicating which user is participating in the game, a first parameter value of each of the plurality of users, and the second parameter value of the game character, the program causing the server to execute a process, the process comprising:

storing, in response to receiving a request to participate in a battle proceeding in the game from a terminal device of any one of the plurality of users, a user using the terminal device as a participating user in the memory, and transmitting data, over a computer network, for displaying a battle screen including information relating to the battle to said terminal device;

executing the battle with which said participating user uses the first parameter value for proceeding, to reduce at least one of the first parameter value of said participating user and the second parameter value of said game character, and monitoring the battle, in response to receiving a request to proceed with the battle from said terminal device;

retrieving, in response to the first parameter value of said participating user falling below a threshold value, said participation data for other user different from said participating user, the other user belongs to a team to which said participating user belongs and is not participating in the battle;

transmitting, to a terminal device of said other user, over the computer network, data for displaying a request screen for requesting said other user to participate in the battle, the request screen including information on a reward which a user can obtain when the battle is over and information on users participating in the battle; and allowing said other user to participate in the battle, in response to receiving a request to participate in the battle from the terminal device of said other user, wherein the plurality of users are displayed on the battle screen in accordance with predetermined criteria.

19. A server for providing a game in which a plurality of users participate, to battle against a game character, to a plurality of terminal devices respectively used by the plurality of users, the server comprising:

a memory for storing team data indicating teams to which each of the plurality of users belong, participation data indicating which user is participating in the game, a first parameter value of each of the plurality of users, and a second parameter value of the game character; and circuitry configured to communicate with a terminal device of each of the plurality of users;

store, in response to receiving a request to participate in a battle proceeding in the game from a terminal device of any one of the plurality of users, a user using the terminal device as a participating user in the memory, and transmit data, over a computer network, for displaying a battle screen including information relating to the battle to said terminal device;

execute the battle with which said participating user uses the first parameter value for proceeding, to reduce at least one of the first parameter value of said participating user and the second parameter value of said game character, and monitoring the battle, in response to receiving a request to proceed with the battle from said terminal device;

retrieve, in response to the first parameter value of said participating user falling below a threshold value, said participation data for other user different from said participating user, the other user belongs to a team to which said participating user belongs and is not participating in the battle;

transmit, to a terminal device of said other user, over the computer network, data for displaying a request screen for requesting said other user to participate in the battle, the request screen including information on a reward which a user can obtain when the battle is over and information on users participating in the battle; and allow said other user to participate in the battle, in response to receiving a request to participate in the battle from the terminal device of said other user, wherein the plurality of users are displayed on the battle screen in accordance with predetermined criteria.

20. A server device for providing a game in which a plurality of users participate, to battle against a game character, to a plurality of terminal devices respectively used by the plurality of users, the server device comprising:

a storage means for storing team data indicating teams to which each of the plurality of users belong, participation data indicating which user is participating in the game, a first parameter value of each of the plurality of users, and a second parameter value of the game character;

a means for communicating with a terminal device of each of the plurality of users;

a means for storing, in response to receiving a request to participate in a battle proceeding in the game from a terminal device of any one of the plurality of users, a user using the terminal device as a participating user in a memory, and transmitting data, over a computer network, for displaying a battle screen including information relating to the battle to said terminal device;

a means for executing the battle with which said participating user uses the first parameter value for proceeding, to reduce at least one of the first parameter value of said participating user and the second parameter value of said game character, and monitoring the battle, in response to receiving a request to proceed with the battle from said terminal device;

a means for retrieving, in response to the first parameter value of said participating user has fallen below a threshold value, said participation data for other user different from said participating user, the other user belongs to a team to which said participating user belongs and is not participating in the battle;

a means for transmitting, to a terminal device of said other user, over the computer network, data for displaying a request screen for requesting said other user different user to participate in the battle, the request screen including information on a reward which a user can obtain in response to when the battle is over and information on users participating in the battle; and a means for allowing said other user to participate in the battle, in response to receiving a request to participate in the battle from the terminal device of said other user, wherein the plurality of users are displayed on the battle screen in accordance with predetermined criteria.

21. A system comprising a server for providing a game in which a plurality of users participate, to battle against a game character, to a plurality of terminal devices respectively used by the plurality of users, and a terminal device of each of the plurality of users, the server including:

a memory for storing team data indicating teams to which each of the plurality of users belong, participation data indicating which user is participating in the game, a first parameter value of each of the plurality of users, and a second parameter value of the game character;

first circuitry configured to communicate with the terminal device;

store, in response to receiving a request to participate in a battle proceeding in the game from a terminal device of any one of the plurality of users, a user using the terminal device as a participating user in the memory, and transmitting data, over a computer network, for displaying a battle screen including information relating to the battle to said terminal device;

execute the battle with which said participating user uses the first parameter value for proceeding, to reduce at least one of the first parameter value of said participating user and the second parameter value of said game character, and monitoring the battle, in response to receiving a request to proceed with the battle from said terminal device;

retrieve, in response to the first parameter value of said participating user has fallen below a threshold value, said participation data for other user different from said participating user, the other user belongs to a team to which said participating user belongs and is not participating in the battle;

transmit, to a terminal device of said other user, over the computer network, data for displaying a request screen for requesting said other user to participate in the battle, the request screen including information on a reward which a user can obtain in response to when the battle is over and information on users participating in the battle; and allow said other user to participate in the battle, in response to receiving a request to participate in the battle from the terminal device of said other user, and the terminal device including:

second circuitry configured to communicate with the server; and transmit, to the server, the request to participate in the battle and the request to proceed with the battle, wherein the plurality of users are displayed on the battle screen in accordance with predetermined criteria.

* * * * *